(12) United States Patent
Mercep et al.

(10) Patent No.: US 10,553,044 B2
(45) Date of Patent: Feb. 4, 2020

(54) SELF-DIAGNOSIS OF FAULTS WITH A SECONDARY SYSTEM IN AN AUTONOMOUS DRIVING SYSTEM

(71) Applicant: Mentor Graphics Development (Deutschland) GmbH, Wilsonville, OR (US)

(72) Inventors: Ljubo Mercep, München (DE); Matthias Pollach, München (DE)

(73) Assignee: Mentor Graphics Development (Deutschland) GmbH, Villingen-Schwenningen (DE)

( * ) Notice: Subject to any disclaimer, the term of this patent is extended or adjusted under 35 U.S.C. 154(b) by 177 days.

(21) Appl. No.: 15/885,023

(22) Filed: Jan. 31, 2018

(65) Prior Publication Data

US 2019/0236862 A1    Aug. 1, 2019

(51) Int. Cl.
*G07C 5/08* (2006.01)
*B60W 30/095* (2012.01)
(Continued)

(52) U.S. Cl.
CPC ....... *G07C 5/0808* (2013.01); *B60W 30/0956* (2013.01); *G05D 1/0055* (2013.01);
(Continued)

(58) Field of Classification Search
CPC .. G07C 5/0808; G07C 5/0816; G05D 1/0088; G05D 1/0055; G08G 1/165; G08G 1/166;
(Continued)

(56) References Cited

U.S. PATENT DOCUMENTS 5,363,305 A    11/1994  Cox et al.
5,883,586 A    3/1999   Tran
(Continued)

FOREIGN PATENT DOCUMENTS

CN    101 876 750 B     11/2015
EP      2 107 503 A1    10/2009
WO    2009/070069 A1     6/2009

OTHER PUBLICATIONS

Barzilay and Szolovits, "Exact inference in bayes nets—pseudocode." Mass. Init. Technology (retrieved at http://courses.csail.mit.edu/6.034s/handouts/spring12/bayesnets-pseudocode.pdf on Jun. 4, 2018), Feb. 2012.

(Continued)

*Primary Examiner* — Muhammad Shafi

(57) ABSTRACT

This application discloses self-diagnosis of faults for an assisted or automated driving system of a vehicle. A primary computing system can generate an environmental model populated with objects detected from measurement data from sensors. A secondary computing system can generate a secondary system data structure configured to identify objects located around the vehicle that were detected from measurement data from the sensors. The secondary computing system can identify a fault in the sensors based on a comparison of the secondary system data structure with the environmental model. The secondary computing system also can estimate an amount of time before the vehicle crashes from a vehicle velocity vector and free space in the environment around the vehicle, and identify the fault in the sensors based on the estimated amount of time before the vehicle crashes.

17 Claims, 9 Drawing Sheets

(51) Int. Cl.
*G06K 9/00* (2006.01)
*G05D 1/00* (2006.01)
*G08G 1/16* (2006.01)

(52) U.S. Cl.
CPC ....... *G05D 1/0088* (2013.01); *G06K 9/00805* (2013.01); *G07C 5/0816* (2013.01); *G08G 1/165* (2013.01); *G08G 1/166* (2013.01); *B60W 2550/10* (2013.01)

(58) Field of Classification Search
CPC .......... G06K 9/00805; B60W 30/0956; B60W 2550/10
USPC ...................................................... 701/29.1
See application file for complete search history.

(56) References Cited

U.S. PATENT DOCUMENTS

| | | | |
|---|---|---|---|
| 6,453,223 B1 | 9/2002 | Kelly | |
| 8,665,080 B2 | 3/2014 | Nagamine | |
| 8,805,648 B2 | 8/2014 | Painsky | |
| 8,912,978 B2 | 12/2014 | Szczerba | |
| 9,043,072 B1 | 5/2015 | Tisdale et al. | |
| 9,097,800 B1 | 8/2015 | Zhu | |
| 9,243,916 B2 | 1/2016 | Roumeliotis | |
| 9,285,805 B1 | 3/2016 | Pollock | |
| 9,336,436 B1 | 5/2016 | Dowdall | |
| 9,384,402 B1* | 7/2016 | Furman | G06K 9/00805 |
| 9,690,293 B2 | 1/2017 | Shashua | |
| 9,612,123 B1* | 4/2017 | Levinson | G01C 21/32 |
| 9,623,905 B2 | 4/2017 | Shashua | |
| 9,665,100 B2 | 5/2017 | Shashuas | |
| 9,672,446 B1 | 6/2017 | Vallespi-Gonzalez | |
| 9,696,719 B2 | 7/2017 | Aviel | |
| 9,709,986 B2 | 7/2017 | Gdalyahu | |
| 9,719,801 B1 | 8/2017 | Ferguson et al. | |
| 9,760,090 B2 | 9/2017 | Shashua | |
| 2001/0040505 A1 | 11/2001 | Ishida | |
| 2004/0064241 A1 | 4/2004 | Sekiguchi | |
| 2007/0010933 A1 | 1/2007 | Hochkirchen | |
| 2007/0182623 A1* | 8/2007 | Zeng | G01S 7/4026 342/174 |
| 2008/0033645 A1 | 2/2008 | Levinson et al. | |
| 2008/0243378 A1 | 2/2008 | Zavoli | |
| 2008/0189003 A1 | 8/2008 | Gillula | |
| 2009/0228204 A1 | 9/2009 | Zavoli | |
| 2009/0268947 A1 | 10/2009 | Schaufler | |
| 2010/0013615 A1 | 1/2010 | Herbert et al. | |
| 2010/0191391 A1 | 7/2010 | Zeng | |
| 2010/0228427 A1* | 9/2010 | Anderson | B60W 30/09 701/31.4 |
| 2012/0136510 A1* | 5/2012 | Min | G01S 17/88 701/2 |
| 2012/0310516 A1* | 12/2012 | Zeng | G01C 21/32 701/300 |
| 2013/0091503 A1 | 4/2013 | Painsky | |
| 2014/0358840 A1 | 12/2014 | Tadic | |
| 2014/0379254 A1 | 12/2014 | Miksa | |
| 2015/0073663 A1 | 3/2015 | Nilsson | |
| 2015/0210312 A1 | 7/2015 | Stein | |
| 2015/0268058 A1 | 9/2015 | Samarasekera | |
| 2016/0033297 A1 | 2/2016 | Konishi | |
| 2016/0039409 A1 | 2/2016 | Hayakawa | |
| 2016/0140872 A1 | 5/2016 | Palmer | |
| 2016/0223643 A1 | 8/2016 | Li et al. | |
| 2016/0357188 A1 | 12/2016 | Ansari | |
| 2017/0050566 A1 | 2/2017 | Yamashita | |
| 2017/0060810 A1 | 3/2017 | Preston | |
| 2017/0076455 A1 | 3/2017 | Newman | |
| 2017/0080950 A1* | 3/2017 | Pink | G06K 9/6289 |
| 2017/0052032 A1 | 4/2017 | Miksa | |
| 2017/0123428 A1 | 5/2017 | Levinson et al. | |
| 2017/0124781 A1 | 5/2017 | Douillard | |
| 2017/0190334 A1 | 7/2017 | Zelman | |
| 2017/0248963 A1 | 8/2017 | Levinson | |
| 2017/0261324 A1 | 9/2017 | Roumeliotis | |
| 2017/0270361 A1 | 9/2017 | Puttagunta | |
| 2017/0329332 A1 | 11/2017 | Pilarski et al. | |
| 2017/0343356 A1 | 11/2017 | Roumeliotis | |
| 2018/0003512 A1 | 1/2018 | Lynch | |
| 2018/0024565 A1 | 1/2018 | Fridman | |
| 2018/0032082 A1 | 2/2018 | Shalev-shwartz | |
| 2018/0172454 A1 | 6/2018 | Ghadiok et al. | |
| 2018/0202815 A1 | 7/2018 | Asai | |
| 2019/0004526 A1* | 1/2019 | Soliman | G05D 1/0217 |

OTHER PUBLICATIONS

T. M. Chan. "Optimal output-sensitive convex hull algorithms in two and three dimensions." Discrete and Computational Geometry, vol. 16, Issue No. 4, pp. 361-368, Jan. 1, 1996.

Hyunggi Cho, Young-Woo Seo, BVK Vijaya Kumar, and Ragunathan Raj Rajkumar. "A multi-sensor fusion system for moving object detection and tracking in urban driving environments." IEEE International Conference on Robotics and Automation (ICRA), pp. 1836-1843. IEEE, May 2014.

N. Dalal and B. Triggs. "Histograms of oriented gradients for human detection." IEEE Computer Society Conference on Computer Vision and Pattern Recognition (CVPR'05), vol. 1, pp. 886-893, Jun. 2005.

Martin Ester, Hans peter Kriegel, Jrg Sander, and Xiaowei Xu. "A density-based algorithm for discovering clusters in large spatial databases with noise." pp. 226-231. Proc. 2nd Int. Conf. Knowledge Discovery and Data Mining (KDD'96), American Association for Artificial Intelligence (AAAI) Press, Aug. 1996.

K. C. Fuerstenberg, K. C. J. Dietmayer, and V. Willhoeft. "Pedestrian recognition in urban traffic using a vehicle based multilayer laserscanner" IEEE Intelligent Vehicle Symposium, vol. 1, pp. 31-35, Jun. 2002.

Daniel Gohring, Miao Wang, Michael Schnurmacher, and Tinosch Ganjineh. "Radar/lidar sensor fusion for car-following on highways." IEEE 2011 5th International Conference on Automation, Robotics and Applications (ICARA), pp. 407-412, Dec. 2011.

John A Hartigan and Manchek A Wong. "Algorithm as 136: A k-means clustering algorithm." Journal of the Royal Statistical Society. Series C (Applied Statistics), vol. 28, issue 1, pp. 100-108, Jan. 1979.

S. C. Johnson. "Hierarchical clustering schemes." Psychometrika, vol. 32, issue 3, pp. 241-254, Sep. 1967.

N. Kaempchen, M. Buehler, and K. Dietmayer. "Feature-level fusion for freeform object tracking using laserscanner and video." Intelligent Vehicles Symposium, IEEE Proceedings, pp. 453-458, Jun. 2005.

Nico Kaempchen and Klaus Dietmayer. "Data synchronization strategies for multi-sensor fusion." Intelligent Transportation Systems, Proceedings of the IEEE Conference, pp. 1-9, Oct. 2003.

Nico Kampchen. "Feature-level fusion of laser scanner and video data for advanced driver assistance systems." University of Ulm Faculty, Engineering Sciences, Computer Science, Jun. 2007.

D. Kellner, M. Barjenbruch, K. Dietmayer, J. Klappstein, and J. Dickmann. "Instantaneous lateral velocity estimation of a vehicle using doppler radar." Information Fusion, Proceedings of the 16th International Conference, pp. 877-884, Jul. 2013.

P. Kmiotek and Y. Ruichek. "Representing and tracking of dynamics objects using oriented bounding box and extended kalman filter." 11th International IEEE Conference on Intelligent Transportation Systems, pp. 322-328, Oct. 2008.

S. Lange, F. Ulbrich, and D. Goehring. "Online vehicle detection using deep neural networks and lidar based preselected image patches." IEEE Intelligent Vehicles Symposium (IV), pp. 954-959, Jun. 2016.

H. A. Loeliger, J. Dauwels, J. Hu, S. Korl, L. Ping, and F. R. Kschischang. "The factor graph approach to model-based signal processing." Proceedings of the IEEE, vol. 95, issue 6, pp. 1295-1322, Jun. 2007.

(56) References Cited

OTHER PUBLICATIONS

M. Mahlisch, R. Schweiger, W. Ritter, and K. Dietmayer. "Sensorfusion using spatio-temporal aligned video and lidar for improved vehicle detection." IEEE Intelligent Vehicles Symposium, pp. 424-429, Jun. 2006.

Ljubo Mercep. "Context-Centric Design of Automotive Human-Machine Interfaces." PhD thesis, Technische Universiat Munchen. Jan. 2014.

S. Roberts. "Parametric and non-parametric unsupervised cluster analysis." Pattern Recognition. vol. 30, pp. 261-272. Apr. 1996.

J. Sankaran and N. Zoran. Tda2x, a soc optimized for advanced driver assistance systems. Speech and Signal Processing (ICASSP), IEEE International Conference on Acoustics, pp. 2204-2208, May 2014.

R. Schubert, C. Adam, M. Obst, N. Mattern, V. Leonhardt, and G. Wanielik. "Empirical evaluation of vehicular models for ego motion estimation." 2011 IEEE Intelligent Vehicles Symposium (IV), pp. 534-539, Jun. 2011.

Neil Scicluna and Christos-Savvas Bouganis. "ARC 2014: A Multidimensional FPGA-Based Parallel DBSCAN Architecture." ACM Transactions on Reconfigurable Technology and Systems. vol. 9, issue 1, pp. 1-12, Nov. 2015.

Qi Yue Shaobo Shi and Qin Wang. "Fpga based accelerator for parallel dbscan algorithm." Computer Modelling & New Technologies. vol. 18, issue 2, pp. 135-142, Jan. 2014.

Z. Taylor and J. Nieto. "Motion-based calibration of multimodal sensor extrinsics and timing o_set estimation." IEEE Transactions on Robotics. vol. 32, issue 5, pp. 1215-1229, Oct. 2016.

Rui Xu and D. Wunsch, II. "Survey of clustering algorithms." Trans. Neur. Netw. vol. 16, issue 3, pp. 645-678, May 2005.

Christopher M. Bishop. "Pattern Recognition and Machine Learning (Information Science and Statistics)." Springer-Verlag New York, Inc., Secaucus, NJ,USA, pp. 423-435, pp. 423-435, Aug. 2006.

Judea Pearl. "Probabilistic Reasoning in Intelligent Systems: Networks of Plausible Inference." Morgan Kaufmann Publishers Inc., San Francisco, CA, USA, p. 116-123, Sep. 1988.

David L. Hall and Sonya A. H. McMullen. "Mathematical techniques in multisensor data fusion." Artech House Information Warfare Library. pp. 1-4, Feb. 2004.

Fredrik Sandblom et al, "Sensor Data Fusion for Multiple Configurations", 2014Ieee Intelligent Vehicles Syposium Proceedings, Jun. 8, 2014, pp. 1325-1331.

N. Floudas et al: "Multi-Sensor Coordination and Fusion for Automotive Safety Applications", 20069th International Conference on Information Fusion, Fusion 2006 Inst. of Elec. and Elec. Eng. Computer Society US, IEEE, Piscataway, NJ, USA, Jul. 31, 2006, pp. 1-8.

C. Coue et al: "Using Bayesian Programming for Multi-sensor Multi-target Tracking in Automotive Applications"; Proceedings / 2003 IEEE International Conference on Robotics and Automation : Sep. 14-19, 2003. The Grand Hotel. Taipei, Taiwan; [Proceedings of the IEEE International Conference on Robotics and Automation], IEEE Service Center. Piscataway, NJ.; vol. 2, pp. 2104-2109.

Weiss K et al: "Target modeling and dynamic classification for adaptive sensor data fusion"; Proc. IEEE Intelligent Vehicle Symposium 2003 ; Jun. 9, 2003 (Jun. 9, 2003), pp. 132-137.

\* cited by examiner

SELF-DIAGNOSIS OF FAULTS WITH A SECONDARY SYSTEM IN AN AUTONOMOUS DRIVING SYSTEM

TECHNICAL FIELD

This application is generally related to automated driving and assistance systems and, more specifically, to self-diagnosis of faults in an autonomous driving system.

BACKGROUND

Many modern vehicles include built-in advanced driver assistance systems (ADAS) to provide automated safety and/or assisted driving functionality. For example, these advanced driver assistance systems can have applications to implement adaptive cruise control, automatic parking, automated braking, blind spot monitoring, collision avoidance, driver drowsiness detection, lane departure warning, or the like. The next generation of vehicles can include autonomous driving (AD) systems to control and navigate the vehicles independent of human interaction.

These vehicles typically include multiple sensors, such as one or more cameras, a Light Detection and Ranging (LIDAR) sensor, a Radio Detection and Ranging (RADAR) system, ultrasonic, or the like, to measure the environment around the vehicles. Applications in advanced driver assistance systems or autonomous driving systems can detect objects within their field of view, and then utilize the detected objects to implement automated safety and/or driving functionality.

When the advanced driver assistance systems or autonomous driving systems experience faults, such as faulty sensors or aberrant processing of sensor data, the advanced driver assistance systems or autonomous driving systems may incorrectly detect objects, which can cause erroneous implementation of automated safety and/or driving functionality.

SUMMARY

This application discloses self-diagnosis of faults for an assisted or automated driving system of a vehicle. A primary computing system can generate an environmental model populated with objects detected from measurement data from sensors. A secondary computing system can generate a secondary system data structure or an occupancy space data structure configured to identify objects located around the vehicle that were detected from measurement data from the sensors. The secondary computing system can identify a fault in the sensors based on a comparison of the occupancy space data structure with the environmental model. The secondary computing system also can estimate an amount of time before the vehicle crashes from a vehicle velocity vector and free space in the environment around the vehicle, and identify the fault in the sensors based on the estimated amount of time before the vehicle crashes. Embodiments will be described below in greater detail.

DETAILED DESCRIPTION

Autonomous Driving System

Figure 1:
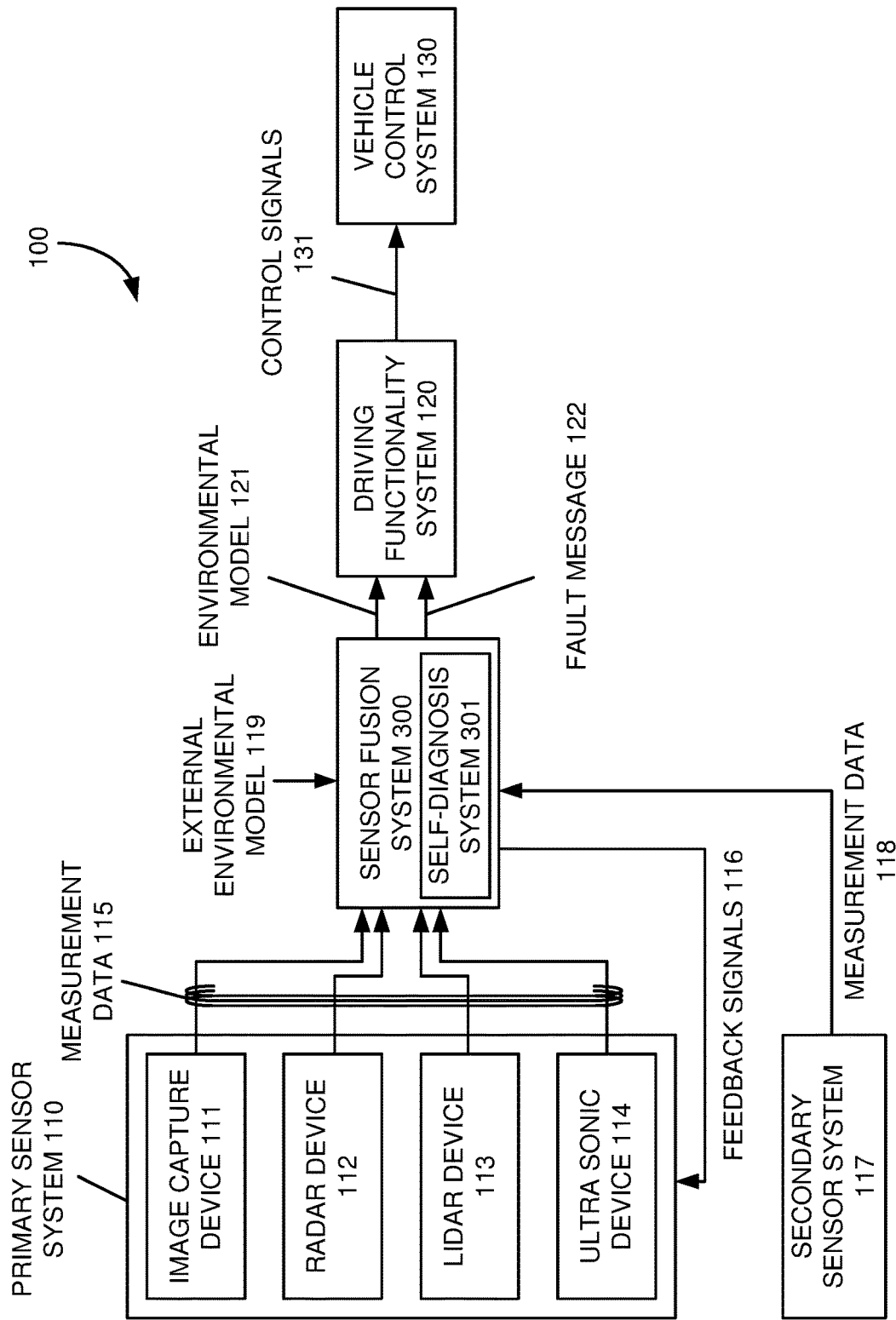
FIG. 1 illustrates an example autonomous driving system according to various embodiments.

FIG. 1 illustrates an example autonomous driving system 100 according to various embodiments. Referring to FIG. 1, the autonomous driving system 100, when installed in a vehicle, can sense an environment around or adjacent to the vehicle and control operation of the vehicle based, at least in part, on the sensed environment.

The autonomous driving system 100 can include a primary sensor system 110 and a secondary sensor system 117, each having multiple sensors to measure the environment around or adjacent to the vehicle. The primary sensor system 110 can output the measured environment as measurement data 115, while the secondary sensor system 117 can output the measured environment as measurement data 118. The measurement data 115 and 118 can include raw measurements from sensors in the primary sensor system 110 and the secondary sensor system 117, such as characteristics of light, electromagnetic waves, or sound captured by the sensors, such as an intensity or a frequency of the light, electromagnetic waves, or the sound, an angle of reception by the sensors, a time delay between a transmission and the corresponding reception of the light, electromagnetic waves, or the sound, a time of capture of the light, electromagnetic waves, or sound, or the like.

The primary sensor system 110 can include multiple different types of sensors, such as an image capture device 111, a Radio Detection and Ranging (RADAR) device 112, a Light Detection and Ranging (LIDAR) device 113, an ultra-sonic device 114, one or more microphones, infrared or night-vision cameras, time-of-flight cameras, cameras capable of detecting and transmitting differences in pixel intensity, or the like. Although not shown in FIG. 1, the secondary sensor system 117 can include the same types of sensors as the primary sensor system 110, a subset of the sensor types in the primary sensor system 110, one or more different types of sensors, or the like.

The image capture device 111, such as one or more cameras or event-based cameras, can capture at least one image of at least a portion of the environment around or adjacent to the vehicle. The image capture device 111 can output the captured image(s) as measurement data 115, which, in some embodiments, can be unprocessed and/or uncompressed pixel data corresponding to the captured image(s).

The RADAR device 112 can emit radio signals into the environment around or adjacent to the vehicle. Since the emitted radio signals may reflect off of objects in the environment, the RADAR device 112 can detect the reflected radio signals incoming from the environment. The RADAR device 112 can measure the incoming radio signals by, for example, measuring a signal strength of the radio signals, a reception angle, a frequency, or the like. The RADAR device 112 also can measure a time delay between an emission of a radio signal and a measurement of the incoming radio signals from the environment that corresponds to emitted radio signals reflected off of objects in the environment. The RADAR device 112 can output the measurements of the incoming radio signals as the measurement data 115.

The LIDAR device 113 can transmit light, such as from a laser or other optical transmission device, into the environment around or adjacent to the vehicle. The transmitted light, in some embodiments, can be pulses of ultraviolet light, visible light, near infrared light, or the like. Since the transmitted light can reflect off of objects in the environment, the LIDAR device 113 can include a photo detector to measure light incoming from the environment. The LIDAR device 113 can measure the incoming light by, for example, measuring an intensity of the light, a wavelength, or the like. The LIDAR device 113 also can measure a time delay between a transmission of a light pulse and a measurement of the light incoming from the environment that corresponds to the transmitted light having reflected off of objects in the environment. The LIDAR device 113 can output the measurements of the incoming light and the time delay as the measurement data 115.

The ultra-sonic device 114 can emit acoustic pulses, for example, generated by transducers or the like, into the environment around or adjacent to the vehicle. The ultra-sonic device 114 can detect ultra-sonic sound incoming from the environment, such as, for example, the emitted acoustic pulses having been reflected off of objects in the environment. The ultra-sonic device 114 also can measure a time delay between emission of the acoustic pulses and reception of the ultra-sonic sound from the environment that corresponds to the emitted acoustic pulses having reflected off of objects in the environment. The ultra-sonic device 114 can output the measurements of the incoming ultra-sonic sound and the time delay as the measurement data 115.

Figure 2A:
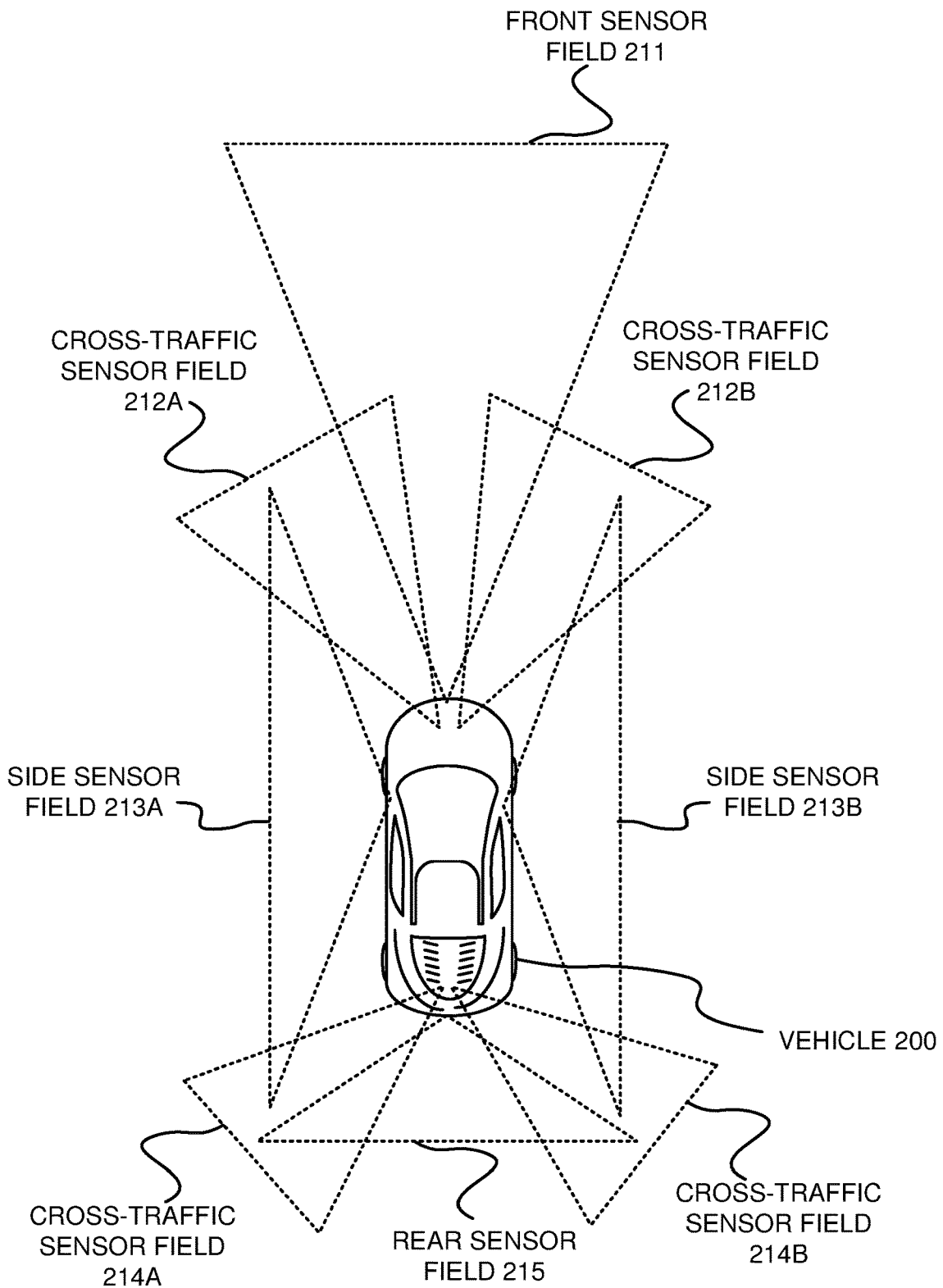
FIG. 2A illustrates an example measurement coordinate fields for a sensor system deployed in a vehicle according to various embodiments.

The different sensors in the primary sensor system 110 and the secondary sensor system 117 can be mounted in the vehicle to capture measurements for different portions of the environment around or adjacent to the vehicle. FIG. 2A illustrates an example measurement coordinate fields for a sensor system deployed in a vehicle 200 according to various embodiments. Referring to FIG. 2A, the vehicle 200 can include multiple different sensors capable of detecting incoming signals, such as light signals, electromagnetic signals, and sound signals. Each of these different sensors can have a different field of view into an environment around the vehicle 200. These fields of view can allow the sensors to measure light and/or sound in different measurement coordinate fields.

The vehicle in this example includes several different measurement coordinate fields, including a front sensor field 211, multiple cross-traffic sensor fields 212A, 212B, 214A, and 214B, a pair of side sensor fields 213A and 213B, and a rear sensor field 215. Each of the measurement coordinate fields can be sensor-centric, meaning that the measurement coordinate fields can describe a coordinate region relative to a location of its corresponding sensor.

Referring back to FIG. 1, the autonomous driving system 100 can include a sensor fusion system 300 to receive the measurement data 115 from the primary sensor system 110 and to populate an environmental model 121 associated with the vehicle with the measurement data 115. In some embodiments, the environmental model 121 can have an environmental coordinate field corresponding to a physical envelope surrounding the vehicle, and the sensor fusion system 300 can populate the environmental model 121 with the measurement data 115 based on the environmental coordinate field. In some embodiments, the environmental coordinate field can be a non-vehicle centric coordinate field, for example, a world coordinate system, a path-centric coordinate field, a coordinate field parallel to a road surface utilized by the vehicle, or the like.

Figure 2B:
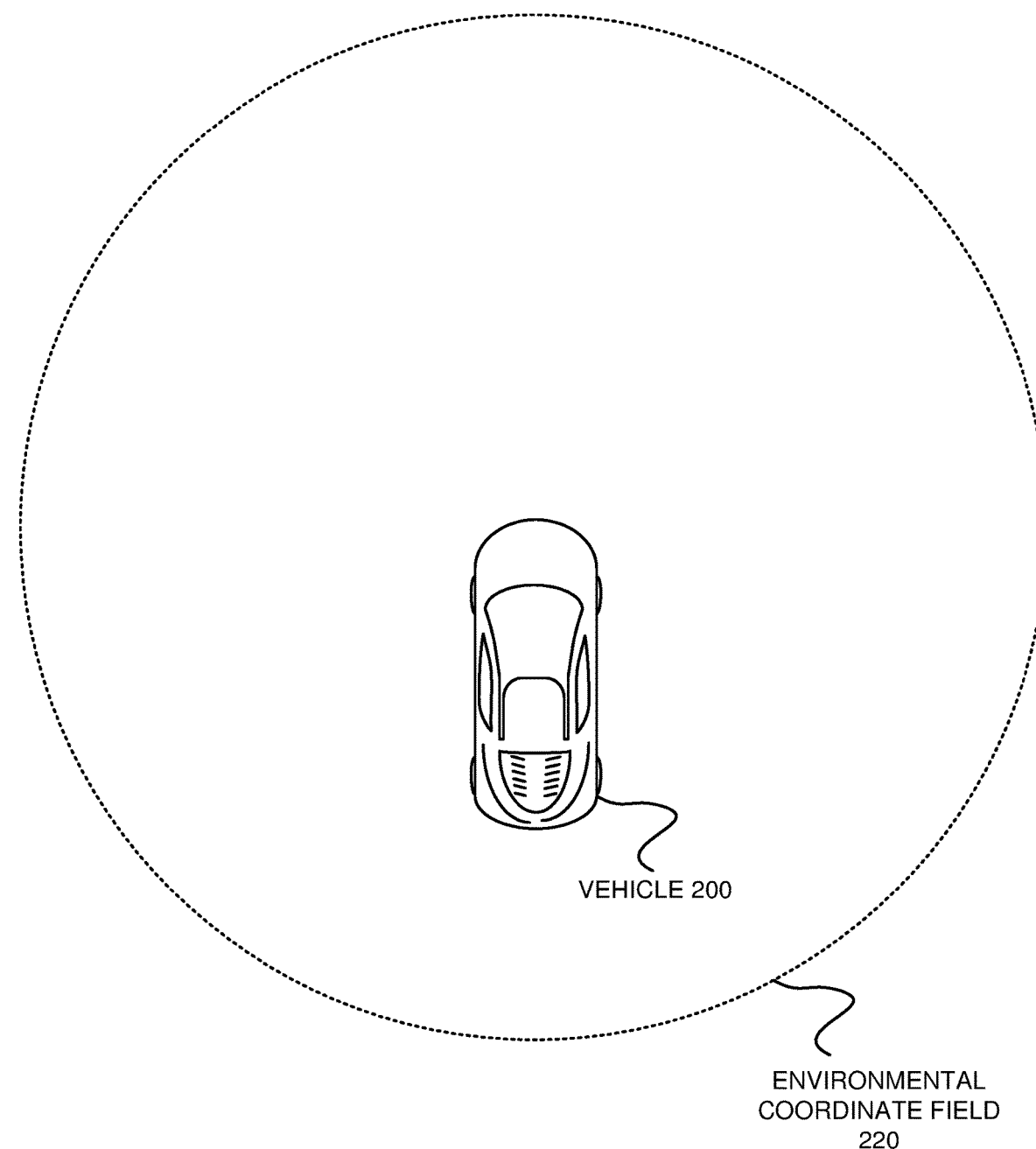
FIG. 2B illustrates an example environmental coordinate field associated with an environmental model for a vehicle according to various embodiments.

FIG. 2B illustrates an example environmental coordinate field 220 associated with an environmental model for the vehicle 200 according to various embodiments. Referring to FIG. 2B, an environment surrounding the vehicle 200 can correspond to the environmental coordinate field 220 for the environmental model. The environmental coordinate field 220 can be vehicle-centric and provide a 360 degree area around the vehicle 200. The environmental model can be populated and annotated with information detected by the sensor fusion system 300 or inputted from external sources. Embodiments will be described below in greater detail.

Referring back to FIG. 1, the sensor fusion system 300 can spatially align the measurement data 115 to the environmental coordinate field of the environmental model 121. The sensor fusion system 300 also can identify when the sensors captured the measurement data 115, for example, by time stamping the measurement data 115 when received from the primary sensor system 110. The sensor fusion system 300 can populate the environmental model 121 with the time stamp or other time-of-capture information, which can be utilized to temporally align the measurement data 115 in the environmental model 121. In some embodiments, the sensor fusion system 300 can analyze the measurement data 115 from the multiple sensors as populated in the environmental model 121 to detect a sensor event or at least one object in the environmental coordinate field associated with the vehicle. The sensor event can include a sensor measurement event corresponding to a presence of the measurement data 115 in the environmental model 121, for example, above a noise threshold. The sensor event can include a sensor detection event corresponding to a spatial and/or temporal grouping of the measurement data 115 in the environmental model 121. The object can correspond to spatial grouping of the measurement data 115 having been tracked in the environmental model 121 over a period of time, allowing the sensor fusion system 300 to determine the measurement data 115 corresponds to an object around the vehicle. The sensor fusion system 300 can populate the environment model 121 with an indication of the detected sensor event or detected object and a confidence level of the detection.

The sensor fusion system 300 also can generate a visibility map to identify which portions of the environmental coordinate field of the environmental model 121 can be populated with sensor measurements and from which sensors. In some embodiments, the sensor fusion system 300 can determine which portions, if any, of the measurement coordinate fields of the sensors that may be blocked, for example, by an object, debris, or the like, and update the visibility map accordingly. For example, when another vehicle is located in front of the vehicle, one or more of the front facing sensors may not be able to capture measurements beyond the location of the other vehicle. In this instance, the sensor fusion system 300 can utilize the detection of vehicle to modify the visibility map.

The sensor fusion system 300 can include a self-diagnosis system 301 to generate a safety environmental model based, at least in part, on the measurement data 118. The self-diagnosis system 301 can compare the safety environmental model and/or an external environmental model 119 against the environmental model 121 to determine whether the primary sensor system 110 or internal processes of the sensor fusion system 300 include any faults. For example, the sensors in the primary sensor system 110 can become misaligned, have their field of view at least partially blocked by debris, malfunction, or the like.

When the self-diagnosis system 301 identifies one or more faults, the self-diagnosis system 301 can generate a fault message 122, send feedback signals 116 to the primary sensor system 110, perform internal data modifications, or the like. In some embodiments, the feedback signals 116 can be configured to prompt the primary sensor system 110 to calibrate one or more of its sensors. For example, the primary sensor system 110, in response to the feedback signals 116, can re-position at least one of its sensors, expand a field of view of at least one of its sensors, change a refresh rate or exposure time of at least one of its sensors, alter a mode of operation of at least one of its sensors, or the like. The sensor fusion system 300 also may modify the visibility map based on the faults, the fault message 122, or the feedback signals 116. Embodiments of self-diagnosis of faults will be described below in greater detail.

The autonomous driving system 100 can include a driving functionality system 120 to receive at least a portion of the environmental model 121 and/or one or more fault messages 122 from the sensor fusion system 300. The driving functionality system 120 can analyze the data included in the environmental model 121 and/or one or more fault messages 122 to implement automated driving functionality or automated safety and assisted driving functionality for the vehicle. The driving functionality system 120 can generate control signals 131 based on the analysis of the environmental model 121 or the fault messages 122.

The autonomous driving system 100 can include a vehicle control system 130 to receive the control signals 131 from the driving functionality system 120. The vehicle control system 130 can include mechanisms to control operation of the vehicle, for example by controlling different functions of the vehicle, such as braking, acceleration, steering, parking brake, transmission, user interfaces, warning systems, or the like, in response to the control signals.

Self-Diagnosis of Faults in an Autonomous Driving System

Figure 3:
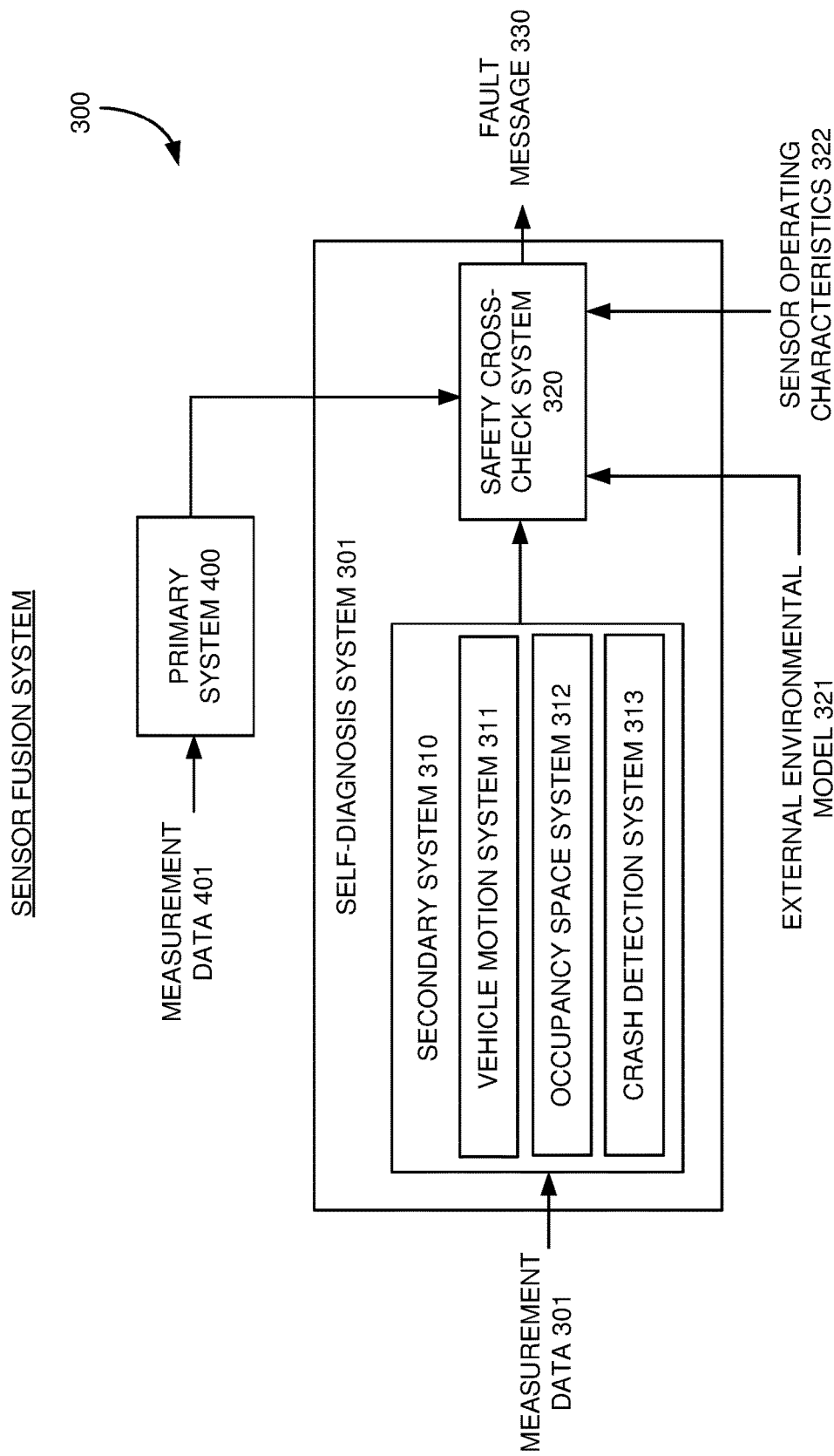
FIGS. 3 and 4 illustrate an example sensor fusion system according to various examples.
Figure 4:
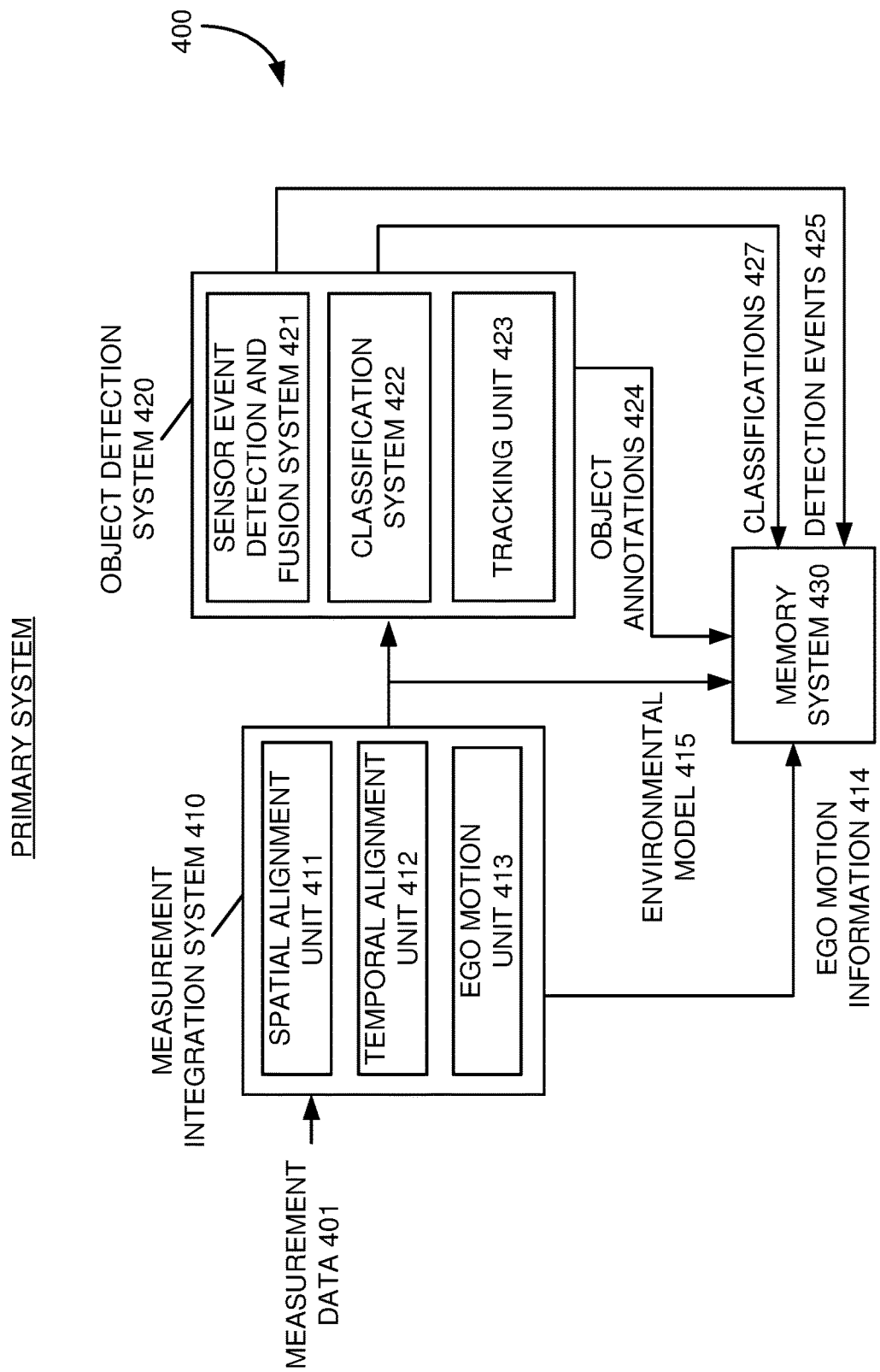

FIGS. 3 and 4 illustrate an example sensor fusion system 300 according to various examples. Referring to FIGS. 3 and 4, the sensor fusion system 300 can include a primary system 400 to receive measurement data 401 from multiple sensors mounted in a vehicle, such as the primary sensor system 110 in FIG. 1. The primary system 400 can include a measurement integration system 410 to generate an environmental model 415 for the vehicle, which can be populated with the measurement data 401. The measurement integration system 410 can include a spatial alignment unit 411 to correlate measurement coordinate fields of the sensors to an environmental coordinate field for the environmental model 415. The measurement integration system 410 can utilize this correlation to convert or translate locations for the measurement data 401 within the measurement coordinate fields into locations within the environmental coordinate field. The measurement integration system 410 can populate the environmental model 415 with the measurement data 401 based on the correlation between the measurement coordinate fields of the sensors to the environmental coordinate field for the environmental model 415.

The measurement integration system 410 also can temporally align the measurement data 401 from different sensors in the sensor system. In some embodiments, the measurement integration system 410 can include a temporal alignment unit 412 to assign time stamps to the measurement data 401 based on when the sensor captured the measurement data 401, when the measurement data 401 was received by the measurement integration system 410, or the like. In some embodiments, the temporal alignment unit 412 can convert a capture time of the measurement data 401 provided by the sensors into a time corresponding to the sensor fusion system 400. The measurement integration system 410 can annotate the measurement data 401 populated in the environmental model 415 with the time stamps for the measurement data 401. The time stamps for the measurement data 401 can be utilized by the sensor fusion system 400 to group the measurement data 401 in the environmental model 415 into different time periods or time slices. In some embodiments, a size or duration of the time periods or time slices can be based, at least in part, on a refresh rate of one or more sensors in the sensor system. For example, the sensor fusion system 400 can set a time slice to correspond to the sensor with a fastest rate of providing new measurement data 401 to the sensor fusion system 400.

The measurement integration system 410 can include an ego motion unit 413 to compensate for movement of at least one sensor capturing the measurement data 401, for example, due to the vehicle driving or moving in the environment. The ego motion unit 413 can generate ego motion information 414, such as an estimated motion of the sensors, a change in the estimated motion of the sensors over time, or the like. The ego motion unit 413 can estimate the motion of the sensor capturing the measurement data 401, for example, by utilizing tracking functionality to analyze vehicle motion information, such as global positioning system (GPS) data, inertial measurements, vehicle odometer data, video images, or the like. The tracking functionality can implement a Kalman filter, a Particle filter, optical flow-based estimator, or the like, to track motion of the vehicle and its corresponding sensors relative to the environment around or adjacent to the vehicle.

The ego motion unit 413 can utilize the estimated motion of the sensor to modify the correlation between the measurement coordinate field of the sensor to the environmental coordinate field for the environmental model 415 and, optionally, to modify the visibility map stored in a memory system 430. This modification of the correlation can allow the measurement integration system 410 to populate the environmental model 415 with the measurement data 401 at locations of the environmental coordinate field where the measurement data 401 was captured as opposed to the current location of the sensor at the end of its measurement capture.

In some embodiments, the ego motion information 414 can be utilized to self-diagnose a fault with one or more of the sensors. For example, when the ego motion information 414 corresponds to motion that the vehicle is incapable of undergoing or movement that exceeds physical or ordinary capabilities of the vehicle, the ego motion unit 413, the sensor fusion system 300 or other device in the autonomous driving system 100 can determine a fault corresponding to the sensor measurements utilized to estimate the motion of the sensors. The ego motion unit 413 can estimate the motion of the sensors, for example, by utilizing tracking functionality to analyze vehicle motion information, such as global positioning system (GPS) data, inertial measurements, vehicle odometer data, video images, or the like. The tracking functionality can implement a Kalman filter, a Particle filter, optical flow-based estimator, or the like, to track motion of the vehicle and its corresponding sensors relative to the environment around or adjacent to the vehicle. When the ego motion unit 413 identifies a fault based on data from the ego motion information 414, the ego motion unit 413 can embed an indication of the fault within the ego motion information 414, which can be stored in the memory system 430.

In some embodiments, the measurement data 401 can include objects or object lists. The measurement integration system 410 can receive the object list from sources external to the vehicle, such as in a vehicle-to-vehicle (V2V) communication, a vehicle-to-infrastructure (V2I) communication, a vehicle-to-pedestrian (V2P) communication, a vehicle-to-device (V2D) communication, a vehicle-to-grid (V2G) communication, or generally a vehicle-to-everything (V2X) communication. The measurement integration system 410 also can receive the objects or an object list from other systems internal to the vehicle, such as from a human machine interface, mapping systems, localization system, driving functionality system, vehicle control system, or the vehicle may be equipped with at least one sensor that outputs the object list.

The object list may include one or more objects, a time stamp for each object, and optionally include a spatial metadata associated with a location of objects in the object list. For example, the object list can include speed measurements for the vehicle, which may not include a spatial component to be stored in the object list as the spatial metadata. When the object list includes a confidence level associated with an object in the object list, the measurement integration system 410 also can annotate the environmental model 415 with the confidence level for the object from the object list.

The measurement integration system 410 can store the environmental model 415 in the memory system 430. The measurement integration system 410 also can store the ego motion information 414, such as the estimated motion of the sensors, a change in the estimated motion of the sensors, or the like, determined by the ego motion unit 413 into the memory system 430.

The primary system 400 can include an object detection system 420 to receive the environmental model 415, for example, from the measurement integration system 410 or by accessing the environmental model 415 stored in the memory system 430. The object detection system 420 can analyze data stored in the environmental model 415 to detect at least one object. The sensor fusion system 400 can populate the environment model 415 with an indication of the detected object at a location in the environmental coordinate field corresponding to the detection. The object detection system 420 can identify confidence levels corresponding to the detected object, which can be based on at least one of a quantity, a quality, or a sensor diversity of measurement data 401 utilized in detecting the object. The sensor fusion system 400 can populate or store the confidence levels corresponding to the detected objects with the environmental model 415. For example, the object detection system 420 can annotate the environmental model 415 with object annotations 424 or the object detection system 420 can output the object annotations 424 to the memory system 430, which populates the environmental model 415 with the detected object and corresponding confidence level of the detection in the object annotations 424.

The object detection system 420 can include a sensor event detection and fusion system 421 to identify detection events 425 from the data stored in the environmental model 415. In some embodiments, the sensor event detection and fusion system 400 can identify the detection events 425 by analyzing the data stored in the environmental model 415 on a per-sensor-type basis to identify patterns in the data, such as image features or data point clusters. When the sensor event detection and fusion system 421 utilizes patterns from a single sensor modality or type to generate the detection events 425, the detection event 425 may be called a sensor detection event. In some embodiments, the sensor event detection and fusion system 421 also can associate or correlate identified patterns across multiple different sensor modalities or types to generate the detection event 425, which can be called a fused sensor detection event.

The sensor event detection and fusion system 421 also can determine differences from adjacent frames or scans of the sensor measurement data on a per-sensor-type basis. For example, the sensor event detection and fusion system 421 can compare the received sensor measurement data from a type of sensor against sensor measurement data from a previously received frame or scan from that type of sensor to determine the differences from adjacent frames or scans of the sensor measurement data. The sensor event detection and fusion system 421 can perform this inter-frame and intra-modality comparison of the sensor measurement data based, at least in part, on the spatial locations of the sensor measurement data in the environmental model 415. For example, when an image capture sensor provides entire image frames, the sensor event detection and fusion system 421 can cache the entire image frames, determine inter-frame differences for the sensor measurement data from a plurality of the cached image frames. In another example, when an image capture sensor provided event-based pixels, the sensor event detection and fusion system 421 can perform pixel caching to generate an entire image from the image data. The sensor event detection and fusion system 421 can utilize the event-based pixels as the inter-frame differences in the sensor measurement data. In another example, when one or more of the RADAR sensors provides raw signal data in a frequency domain, the sensor event detection and fusion system 421 can detect one or more untracked targets from RADAR measurements. The sensor event detection and fusion system 421 can determine differences between the untracked targets in adjacent frames, which can constitute inter-frame differences in the sensor measurement data for the RADAR sensor modality.

The sensor event detection and fusion system 421 also can identify faults associated with sensor fusion during the object detection. The sensor event detection and fusion system 421 can utilize the visibility map, for example, stored in the memory system 430, to identify which sensors were capable of contributing measurement data 401 during the object detection. In some embodiments, the sensors can be capable of contributing measurement data 401 during the object detection when their corresponding measurement coordinate fields overlap with a location corresponding to the object detection.

The sensor event detection and fusion system 421 can determine whether the measurement data 401 from each of the sensors capable of contributing measurement data 401 was utilized or fused during object detection to identify sensor detection events or fused sensor detection events. For example, when the visibility map indicates that three different sensors had measurement coordinate fields overlapping with sensor detection events or fused sensor detection events, but measurement data 401 from two sensors were utilized by the sensor event detection and fusion system 421 during the sensor fusion, the sensor event detection and fusion system 421 can identify a fault associated with the sensor that did not contribute measurement data during the sensor fusion. The sensor event detection and fusion system 421 can store the identified fault to the memory system 430, utilize the fault to recalibrate one or more of the sensors, or the like. Embodiments of detecting faults during sensor fusion will be described below in greater detail with reference to FIG. 5.

The sensor fusion system 400 can populate or store the detection events 425 with the environmental model 415. For example, the object detection system 420 can annotate the environmental model 415 with the detection events 425, or the object detection system 420 can output the detection events 425 to the memory system 430, which populates the environmental model 415 with the detection events 425.

Figure 5:
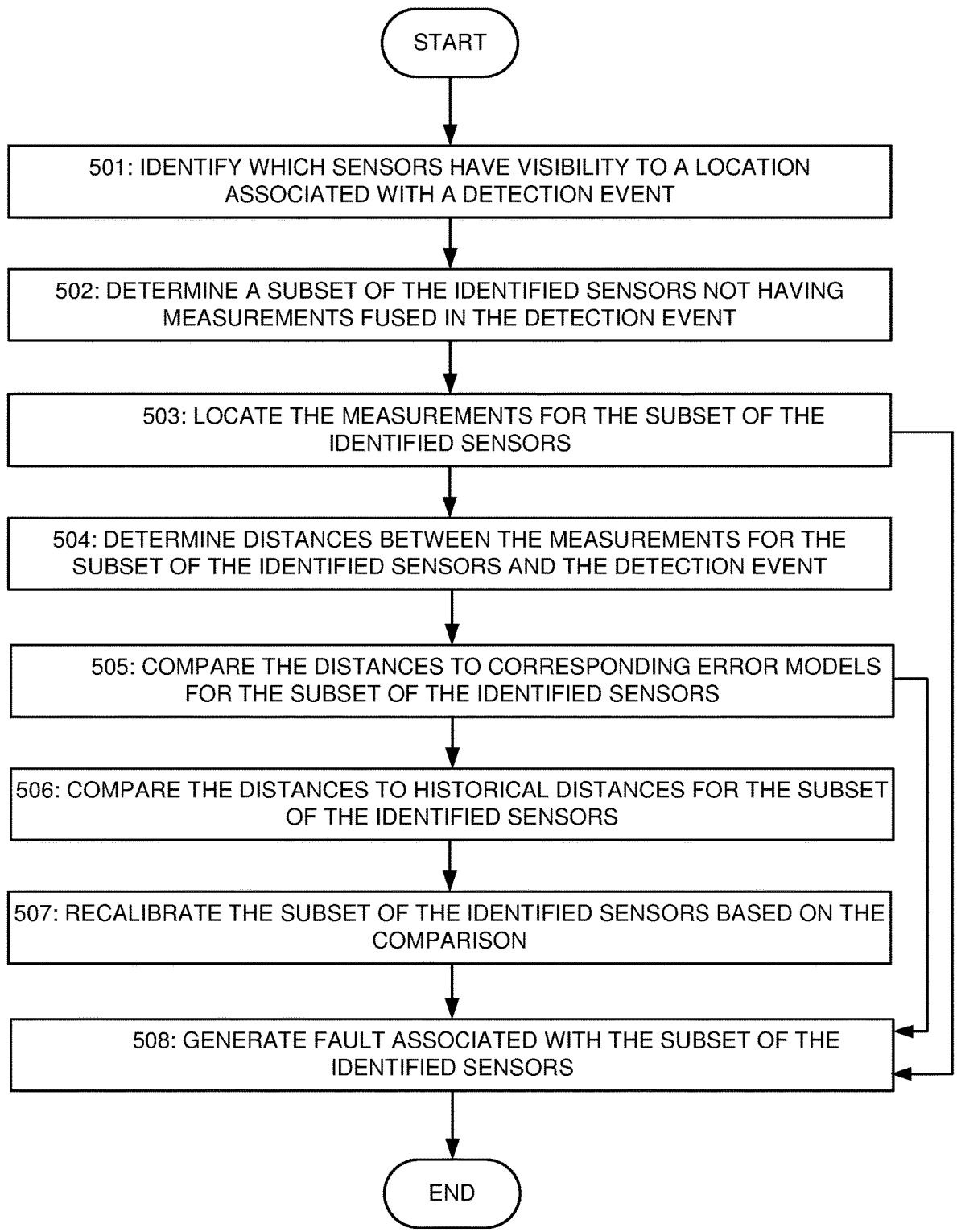
FIG. 5 illustrates an example flowchart for identifying faults during sensor fusion by a sensor fusion system according to various examples.

FIG. 5 illustrates an example flowchart for identifying faults during sensor fusion by a sensor fusion system according to various examples. Referring to FIG. 5, in a block 501, a sensor event detection and fusion system can identify which sensors have visibility to a location associated with a detection event. In some embodiments, the sensor event detection and fusion system can identify the sensors by accessing a visibility map, for example, in a memory system of the sensor fusion system, and determining which sensors have measurement coordinate fields that cover the location of the detection event in the environmental coordinate field.

In a block 502, the sensor event detection and fusion system can determine a subset of the identified sensors not having measurements fused in the detection event. For example, the sensor event detection and fusion system can determine which sensors had measurements utilized in identifying the detection event and compare those sensors against the sensors having visibility to the location associated with the detection event. The sensor event detection and fusion system can ascertain which of the sensors had visibility to the location of the detection event, but did not have measurements utilized in identifying the detection event, as sensors to investigate for possible faults.

In a block 503, the sensor event detection and fusion system can locate the measurements for the subset of the identified sensors. In some embodiments, the sensor event detection and fusion system can access the environmental model, for example, in the memory system of the sensor fusion system, to locate the measurements for the subset of the identified sensors. In some embodiments, the sensor event detection and fusion system can access historical versions of the environmental model, for example, including sensor measurement data previously collected from the subset of the identified sensors.

When, in the block 503, the sensor event detection and fusion system determines no measurements exist for one or more of the sensors in the subset of the identified sensors, in some embodiments, execution can proceed to block 508, where the sensor event detection and fusion system can generate fault associated with the subset of the identified sensors. The sensor event detection and fusion system can generate the fault associated with the subset of the identified sensors by issuing a fault message or other signaling to the autonomous driving system 100, which, in some embodiments, can identify a fault type, information associated with the detection event, and/or a context associated with the identification of the fault, such as the measurements collected by the sensors, the conditions associated with the vehicle, e.g., vehicle speed, external terrain, external lighting, vehicle location, weather conditions, or the like. In some embodiments, when the historical versions of the environmental model indicate that the subset of the identified sensors had sensor measurements, but the current environmental model has no measurements for the subset of the identified sensors, execution can also proceed to block 508, where the sensor event detection and fusion system can generate fault associated with the subset of the identified sensors based, at least in part, on the historical versions of the environmental model compared to the current environmental model.

When, in the block 503, the sensor event detection and fusion system determines measurements exist for one or more of the sensors in the subset of the identified sensors, in a block 504, the sensor event detection and fusion system can determine distances between the measurements for the subset of the identified sensors and the detection event. The distances can correspond to difference in location between the measurements for the subset of the identified sensors and the detection event, for example, within the environmental model. In some embodiments, the sensor event detection and fusion system can determine parameters associated with the measurements for the subset of the identified sensors, such as a signal to noise ratio (SNR) associated with the measurements, velocity of the vehicle or of the detection event, an angular resolution associated with the measurements, or the like.

In a block 505, the sensor event detection and fusion system can compare the distances and/or determined parameters to corresponding error models for the subset of the identified sensors. In some embodiments, each of the sensors or types of sensors can have at least one error model, which can describe expected ranges of measurement error for the sensors. The error models can correspond to covariance matrix or correlation matrix. The comparison of the distances and/or determined parameters to corresponding error models for the subset of the identified sensors can allow the sensor event detection and fusion system to identify whether the distances and/or determined parameters can be attributed to noise or expected measurement error, or whether at least a portion of the distances and/or determined parameters can correspond to a fault in the sensors.

In some embodiments, the sensor event detection and fusion system can utilize additional factors, such as environmental conditions associated with the vehicle, vehicle state, or the like, in the comparison of the distances and/or determined parameters to corresponding error models for the subset of the identified sensors. The environmental conditions can correspond to weather conditions external to the vehicle, road conditions, light levels external to the vehicle, or the like. The vehicle state can correspond to speed of the vehicle, acceleration or deceleration of the vehicle, driving direction, change in directionality, or the like. The sensor event detection and fusion system, in some embodiments, can utilize these additional factors to alter an error measurement range associated with error models.

When the comparison indicated that the distances and/or determined parameters fall within the measurement error described in the error models, the sensor event detection and fusion system can determine to not issue a fault in response to the lack of sensor measurement fusion in the detect event, and, in some embodiments, the sensor event detection and fusion system can correlate the unfused measurements to the detection event. When the comparison indicated that the distances and/or determined parameters fall outside the measurement error described in the error models, execution can proceed to a block 506 or the block 508. In the block 508, the sensor event detection and fusion system can generate a fault for at least one of the sensors in the subset of identified sensors. When execution proceeds to the block 506, the sensor event detection and fusion system can compare the distances to historical distances and/or historical parameters for the subset of the identified sensors. A historical distance or historical parameters for each sensor can describe an aggregation of previously determined distances and/or determined parameters for each sensor in the subset of the identified sensors.

In a block 507, the sensor event detection and fusion system can recalibrate the subset of the identified sensors based on the comparison before proceeding onto the block 508 to generate the fault associated with the subset of the identified sensors. The recalibration of the subset of the identified sensors can be performed after an object detected has been confirmed by the sensor event detection and fusion system, for example, after the detection event has been classified and tracked by the sensor event detection and fusion system.

In some embodiments, when identifying a constant offset for a sensor in the subset of identified sensors, for example, when the determined distance and/or determined parameters for a sensor corresponds to the historical distance or historical parameters for the sensor, the sensor event detection and fusion system can generate one or more feedback signals for the sensor. In some examples, the sensor or other controller in a sensor system, in response to the feedback signals, can re-position its measurement coordinate field to reduce the constant offset detected by the sensor event detection and fusion system. In some embodiments, the sensor event detection and fusion system can utilize the constant offset to modify the spatial alignment of the measurement data in the environmental model. The sensor event detection and fusion system also can modify the visibility map to update the location of the measurement coordinate field for the sensor within the environmental model. The sensor event detection and fusion system, in some embodiments, can correct offsets for sensors based on ground truth data, such as known dimensions of road signs and other objects measured by the sensors, or data received over externally from the vehicle, such as vehicle-to-everything (V2X) data.

Referring back to FIGS. 3 and 4, the object detection system 420 can include a classification system 422 to classify sensor measurement data associated with the detection events 425. In some embodiments, the classification system 422 can assign classifications 427 to the detection events 425 based on the sensor measurement data associated with the detection events 425. The classifications 427 can correspond to a type of object associated with the detection events 425, such as another vehicle, a pedestrian, a cyclist, an animal, a static object, or the like. The classifications 427 also can include a confidence level associated with the classification and/or include more specific information corresponding to a particular pose, orientation, state, or the like, of the object type. In some embodiments, the classification system 422 can implement multiple different types of classification, each of which can generate classifications 427 associated with the detection events 425. The object detection system 420 can annotate the environmental model 415 with the classifications 427 or the object detection system 420 can output the classifications 427 to the memory system 430, which populates the environmental model 415 with the classifications 427.

The classification system 422 can implement multiple different classifiers, which can independently classify the sensor measurement data associated with the detection events 425. For example, the classification system 422 can implement at least one classifier having one or more object models, each to describe a type of object capable of being located proximate to the vehicle. The object models can include matchable data for different object types, and include poses, orientations, transitional states, potential deformations for the poses or orientations, textural features, or the like, to be compared against the sensor measurement data. The classification system 422 can compare the sensor measurement data (or a modified representation of the sensor measurement data) associated with the detection events 425 to one or more of the object models, and generate the classifications 427 based on the comparison.

In some embodiments, the classification system 422 also can perform the classification utilizing a machine learning object classifier. The machine learning object classifier can include multiple classification graphs or tensor graphs, for example, each to describe a different object model. In some embodiments, a classification graph can include multiple nodes, each configured to include matchable data corresponding to a subset of the various poses, orientations, transitional states, potential deformations, textural features, or the like, in the object model. The classification system 400 also can perform the classification utilizing other computational techniques, such as a feed-forward neural network, a support vector machine (SVM), or the like.

The classification system 422 can select one or more of the classification graphs based, at least in part, on the detection events 425. The classification system 400 can traverse nodes in the selected classification graphs, for example, with each node performing a comparison between a portion of the matchable data in the object model to the sensor measurement data (or a modified representation of the sensor measurement data). In some embodiments, the traversal of node can span across classification graphs, for example, where a node in one classification graph can directly provide information to a node in a different classification graph. Each node in the classification graphs can generate a match distance, for example, by generating a confidence level that the sensor measurement data corresponds to the matchable data of the node. The classification system 422 can utilize the match distances from the nodes to generate the classification 427 for the sensor measurement data associated with the detection events. The classification system 422 can utilize the match distances to control the traversal through the nodes in the selected classification graphs, for example, deciding which nodes should attempt to classify the sensor measurement data and in what order, when to cease having nodes attempt to classify the sensor measurement data, or the like.

The multiple classifications 427 of the sensor measurement data associated with the detection event 425 can be utilized to self-diagnose any faults in the classifiers utilized to generate the classifications 427. For example, when the classifiers in the classification system 422 generate different classifications 427 for the same detection event 425, the sensor fusion system 300 can generate a fault message 340 to indicate a presence of divergent classifications of sensor measurement data associated with the detection event 425. In some embodiments, when the classifiers in the classification system 422 detect an unexpected change in a classification of an detected object the sensor fusion system 300 can identify a fault in the classification system 422 or the sensor system. For example, when the classification system 422 has classified an object as a pedestrian with a high confidence level, and then switches the classification to a bicycle after a short period of time, the sensor fusion system 300 can generate the fault message 340 to indicate a presence of a fault in the classifications of sensor measurement data associated with the detection event 425 or the sensor measurement data itself. Embodiments for classification fault detection will be described below in greater detail.

The object detection system 420 can include a tracking unit 423 to track the detection events 425 in the environmental model 415 over time, for example, by analyzing the annotations in the environmental model 415, and determine whether the detection events 425 corresponds to objects in the environmental coordinate system. In some embodiments, the tracking unit 423 can utilize the classifications 427 to track the detection events 425 with at least one state change prediction model, such as a kinetic model, a probabilistic model, or other state change prediction model.

The tracking unit 423 can select the state change prediction model to utilize to track the detection events 425 based on the assigned classifications 427 of the detection events 425. The state change prediction model may allow the tracking unit 423 to implement a state transition prediction, which can assume or predict future states of the detection events 425, for example, based on a location of the detection events 425 in the environmental model 415, a prior movement of the detection events 425, a classification of the detection events 425, or the like. In some embodiments, the tracking unit 423 implementing the kinetic model can utilize kinetic equations for velocity, acceleration, momentum, or the like, to assume or predict the future states of the detection events 425 based, at least in part, on its prior states.

The tracking unit 423 may determine a difference between the predicted future states of the detection events 425 and its actual future states, which the tracking unit 423 may utilize to determine whether the detection events 425 correspond to objects proximate to the vehicle. The tracking unit 423 can track the detection event 425 in the environmental coordinate field associated with the environmental model 415, for example, across multiple different sensors and their corresponding measurement coordinate fields.

When the tracking unit 423, based on the tracking of the detection events 425 with the state change prediction model, determines the detection events 425 are trackable, the tracking unit 423 can annotate the environmental model 415 to indicate the presence of trackable detection events. The tracking unit 423 can continue tracking the trackable detection events over time by implementing the state change prediction models and analyzing the environmental model 415 when updated with additional measurement data 401. After annotating the environmental model 415 to indicate the presence of trackable detection events, the tracking unit 423 can continue to track the trackable detect events in the environmental coordinate field associated with the environmental model 415, for example, across multiple different sensors and their corresponding measurement coordinate fields.

In some embodiments, the tracking unit 423 can be utilized in a self-diagnosis of faults with one or more of the sensors. For example, when the tracking unit 423 identifies motion of measurement data 401 in the environmental model 415 that corresponds to motion the tracked object is incapable of undergoing, for example, that exceeds physical or ordinary capabilities of the object being tracked, the identification of that motion can be utilized to determine a fault corresponding to the measurement data 401. Since the tracking unit 423 can compensate for the ego motion of the vehicle based on the ego motion information 414 during the tracking of the object, the tracking unit 423 can analyze the ego motion information 414 to determine whether a detected fault lies with the ego motion information 414 for the vehicle or the tracking functionality in the tracking unit 423. In some embodiments, the tracking unit 423 can determine the fault based on the identification of that motion or the tracking unit 423 can store the identified motion in the memory system 430 as one or more of the object annotations 424. Embodiments of sensor fault detection based on tracked motion will be described below in greater detail.

The memory system 430 can be accessible by different portions of the autonomous driving system 100, such as a self-diagnosis system 301 in the sensor fusion system 300, a driving functionality system, which can include a localization system, a situational awareness system, or the like. The primary system 400 in the sensor fusion system 300 can produce data, such as the environmental model 415, ego motion information 414, object annotations 424, classifications 427, detection events 425, or the like, and portions of the driving functionality system can consume data, for example, via access to the memory system 430. In some embodiments, the primary system 400 can include a system to output the produced data to the consuming systems based on a subscription basis or in an event-driven manner. The consuming systems, such as a safety cross-check system 330, also can send requests to the primary system 400 for operations to be performed on data within the memory system 430.

The sensor fusion system 300 can include the self-diagnosis system 301, which can analyze information generated by the primary system 400 to determine whether at least one fault exists in the sensor system capturing the measurement data 401 or within the primary system 400 itself.

The self-diagnosis system 301 can include a secondary system 310 to receive measurement data 301 from sensors mounted in the vehicle. In some embodiments, the secondary system 310 can receive the measurement data 301 from a group of sensors, such as the secondary sensor system 117 in FIG. 1. The secondary system 310 may be symmetrical to the primary system 400, for example, receiving the same sensor measurement data and/or processing the sensor measurement data the same or similarly to the primary system 400. The secondary system 310 may be asymmetrical to the primary system 400, for example, receiving different sensor measurement data and/or processing the sensor measurement data differently than the primary system 400. In some embodiments, the secondary system 310 can have lower computational resolution, for example, performing similar processing of sensor measurement data, but with a lower precision.

The secondary system 310 can include a vehicle motion system 311 to estimate a speed of the vehicle and an ego motion of the vehicle based, at least in part, on the measurement data 301. In some embodiments, the vehicle motion system 311 can determine a velocity vector from the measurement data 301, which can include a velocity of the vehicle as well as a directionality of the vehicle.

The secondary system 310 can include an occupancy space system 312 to generate an occupancy space data structure or a secondary system data structure corresponding to the environment around or adjacent to the vehicle. The occupancy space system 312 can utilize the measurement data 301 and, in some embodiments, the velocity vector from the vehicle motion system 311, to detect and track objects in the environment around or adjacent to the vehicle. The occupancy space system 312 can populate the occupancy space data structure with the detected, classified, and/or tracked objects in the environment around or adjacent to the vehicle. In some embodiments, the occupancy space data structure can include the physical border of the vehicle and have a grid-structure to identify locations of the detected and tracked objects in the environment around or adjacent to the vehicle. The occupancy space system 312 can output the occupancy space data structure to the safety cross-check system 320 in the self-diagnosis system 301.

The secondary system 310 can include a crash detection system 313 to utilize the occupancy space data structure and the velocity vector to determine a time until the vehicle crashes into an object identified in the occupancy space data structure. In some embodiments, the crash detection system 313 can determine a free space available to the vehicle by determining a distance between the object and the border of the vehicle in the occupancy space data structure. The crash detection system 313 can utilize the available free space along with the velocity vector and, optionally, the tracked movement of the object in the occupancy space data structure and/or an expected driving corridor for the vehicle to estimate an amount of time before the vehicle contacts with the object. In some embodiments, the crash detection system 313 can detect when a time to crash exists or when the estimated amount of time before a crash falls below a preset threshold level of time. The crash detection system 313 can output the presence of a time to crash and/or the estimated amount of time until a crash to the safety cross-check system 320 in the self-diagnosis system 301. Embodiments of the secondary system will be described below in FIG. 6.

Figure 6:
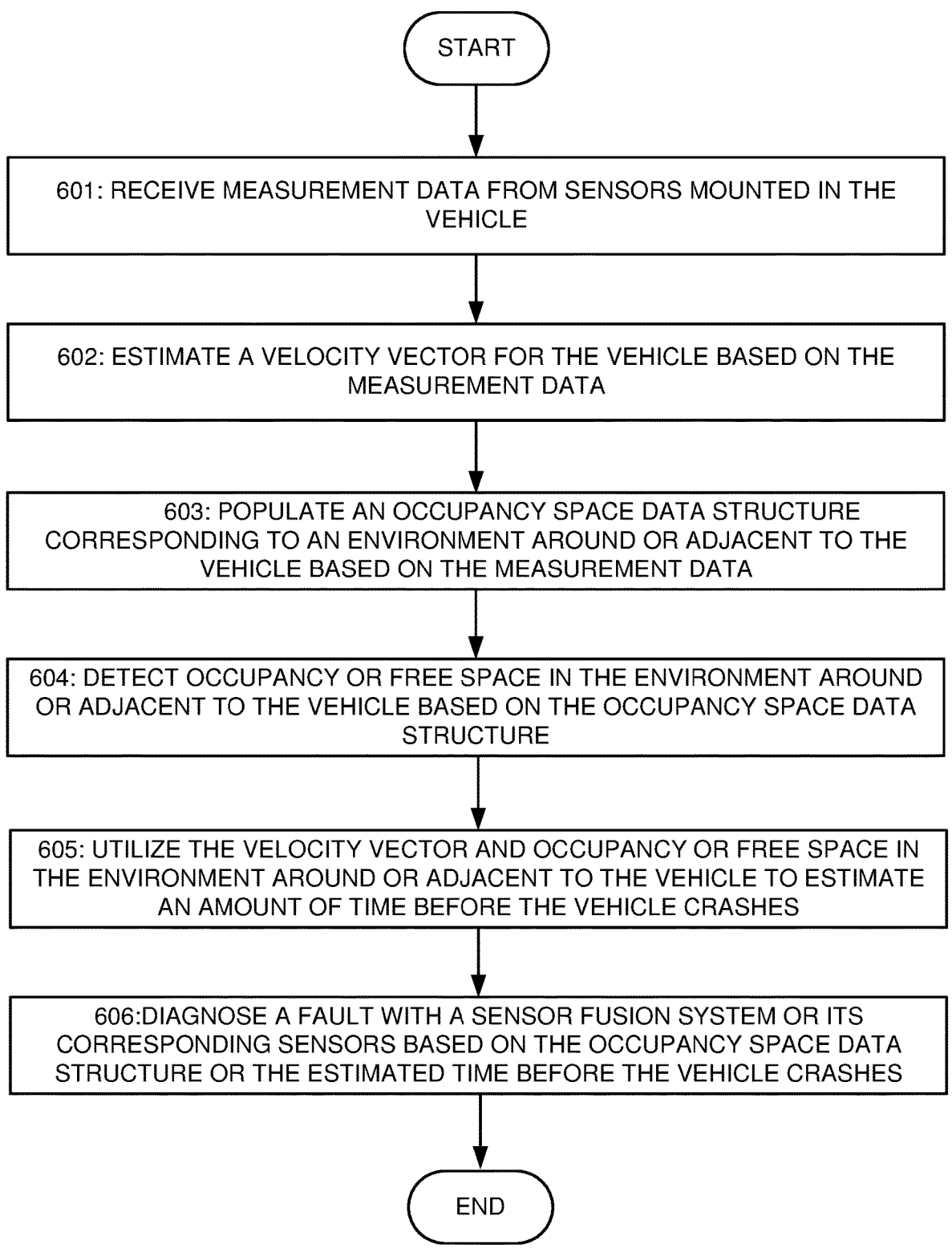
FIG. 6 illustrates an example flowchart for operation of a secondary system according to various examples.

FIG. 6 illustrates an example flowchart for operation of a secondary system according to various examples. Referring to FIG. 6, in a block 601, a secondary system can receive measurement data from sensors mounted in the vehicle. In some embodiments, the secondary system can receive the measurement data from a group of sensors, such as the secondary sensor system 117 in FIG. 1. The secondary system may be asymmetrical to a primary system in the sensor fusion system of an autonomous driving system, for example, receiving different sensor measurement data and/or processing the sensor measurement data differently than the primary system.

In a block 602, the secondary system can estimate a velocity vector for the vehicle based on the measurement data. The velocity vector can include an estimate of a speed of the vehicle and a directionality of the vehicle motion based, at least in part, on the measurement data.

In a block 603, the secondary system can populate an occupancy space data structure corresponding to an environment around or adjacent to the vehicle based on the measurement data. The secondary system can utilize the measurement data and, in some embodiments, the velocity vector, to detect and/or track objects in the environment around or adjacent to the vehicle. The secondary system can populate the occupancy space data structure with the detected and/or tracked objects in the environment around or adjacent to the vehicle. In some embodiments, the occupancy space data structure can include the physical border of the vehicle and have a grid-structure to identify locations of the detected and/or tracked objects in the environment around or adjacent to the vehicle.

In a block 604, the secondary system can detect occupancy or free space in the environment around the vehicle based on the occupancy space data structure. The secondary system can detect occupancy in the environment around or adjacent to the vehicle by identifying which portions of the occupancy space data structure have been populated with detected objects, tracked objects, objects received externally from the vehicle, such as over vehicle-to-everything (V2X) communication or the like, objects populated in map data available to the secondary system, or the like. The secondary system can determine a free space available to the vehicle by determining a distance between the objects in the occupancy space data structure and the border of the vehicle in the occupancy space data structure.

In a block 605, the secondary system can utilize the velocity vector and occupancy or free space in the environment around or adjacent to the vehicle to estimate an amount of time before the vehicle crashes. The secondary system also can utilize the tracked movement of the detected object in the occupancy space data structure and/or an expected driving corridor for the vehicle to estimate the amount of time before the vehicle crashes. In some embodiments, the secondary system can detect whether a time to crash exists or when the estimated amount of time before a crash falls below a preset threshold level of time.

In a block 606, a safety cross-check system can diagnose a fault with a sensor fusion system or its corresponding sensors based on at least one of motion of the vehicle, the motion of the detected object, the occupancy space data structure, or the estimated time before the vehicle crashes. Embodiments of the safety cross-check system will be described below.

Referring back to FIGS. 3 and 4, the safety cross-check system 320 can receive information from the primary system 400, the secondary system 310, and, optionally, one or more sources external to the sensor fusion system 300. The safety cross-check system 320 can analyze the information to detect faults, such as sensor faults, data processing faults by the sensor fusion system 300, or the like, and generate one or more fault messages 330 in response to the detected faults.

In some embodiments, the fault messages 330 can identify a fault type, information associated with the detection event, and/or a context associated with the identification of the fault, such as the measurements collected by the sensors, the conditions associated with the vehicle, e.g., vehicle speed, external terrain, external lighting, vehicle location, weather conditions, or the like. The safety cross-check system 320 can output the fault messages 330 to the sensor fusion system 300 or other systems in an autonomous driving system that includes the sensor fusion system 300. In some embodiments, the fault messages 330 may prompt measurement data from faulty sensors to be marked invalid, so the sensor fusion system 300 does not utilize that measurement data in object detection around or adjacent to the vehicle. The fault messages 330 also may prompt the autonomous driving system to enter a safety mode of operation, which can alter driving strategy and functionality for the autonomous driving system.

The safety cross-check system 320 can access the memory system 430 in the primary system 400 of the sensor fusion system 300 to retrieve ego motion information 414, the environmental model 415, the object annotations 424, the classifications 427, the detection events 425, or the like. In some embodiments, the primary system 400 can provide the information directly to the safety cross-check system 320 rather than provide the safety cross-check system 320 access to the memory system 430. The safety cross-check system 320 can receive information from the secondary system 310, such as the occupancy space data structure, a time to crash, estimated vehicle motion, or the like.

The safety cross-check system 320 also can receive information from external sources, such as an external environmental model 321, sensor operating characteristics 322, or the like. The external environmental model 321 can correspond to an environmental model generated by external to the vehicle and communicated to the safety cross-check system 320, such as in a vehicle-to-vehicle (V2V) communication, a vehicle-to-infrastructure (V2I) communication, a vehicle-to-pedestrian (V2P) communication, a vehicle-to-device (V2D) communication, a vehicle-to-grid (V2G) communication, or generally a vehicle-to-everything (V2X) communication. The sensor operating characteristics 322 can include electrical characteristics of the sensors, such as power consumption over time, for example, from a battery management system in the vehicle, signal to noise ratio (SNR) values over time, or the like, and may also include environmental factors, such as operating temperature, operating temperature relative to external temperature, or the like.

The safety cross-check system 320 can perform multiple different safety checks utilizing the received information, which can indicate presence of faults within one or more of the sensors or the data processing of the primary system 400. For example, when the primary system 400 includes multiple classifiers to generate multiple classifications 427 for the same sensor measurements, the safety cross-check system 320 can compare the classification 427 to ensure that they match or correspond to each other within an error threshold. When the secondary system 310 includes a classifier, the safety cross-check system 320 can compare the classification 427 generated by the primary system 400 against the classifications generated by the secondary system 310 to ensure that they match or correspond to each other, for example, within an error threshold. When the safety cross-check system 320 determines the classifications differ, the safety cross-check system 320 can generate a fault message 330 to indicate that the data processing within one or more of the classifiers within the primary system 400 may be faulty.

Another safety check that the safety cross-check system 320 can perform is a comparison of the environmental model 415 generated by the primary system 400 against the occupancy space data structure and/or one or more external environmental models 321. Since the occupancy space data structure and the external environmental model 321 were generated utilizing different sensor measurement data than the primary system 400, the comparison can allow the safety cross-check system 320 to ensure the sensor system providing measurement data 401 did not include a fault, such as not capturing data measurements, not locating the measurement data 401 in an appropriate location relative to the vehicle, identifying any delay in the primary system 400 for adding the measurement data 401 to the environmental model 415, or the like. When the safety cross-check system 320 determines the environmental model 415 differs from the occupancy space data structure and/or the external environmental model 321, the safety cross-check system 320 can generate a fault message 330 to indicate which sensor providing the measurement data 401 may be faulty.

The safety cross-check system 320 also can perform sensor motion safety check based on changes in tracked object movement and/or ego motion movement determined by the primary system 400. When the changes in tracked object movement and/or ego motion movement exceed physical or expected motion capabilities of the object or the vehicle, respectively, the safety cross-check system 320 can generate a fault message 330 to indicate which sensor providing the measurement data 401 may be faulty.

In some embodiments, the safety cross-check system 320 can receive the ego motion information 414 and the object annotations 424, which the safety cross-check system 320 can utilize to identify changes in tracked object movement and/or ego motion movement. The safety cross-check system 320 can generate the fault message 330 when the object annotations 424 identify a change in tracked object movement that exceeds at least one predetermined movement threshold for the type of tracked object. The predetermined movement threshold can correspond to movement that exceeds physical or expected motion capabilities of the object or the vehicle, for example, violates a kinetic or motion model utilized for ego motion or object tracking. The safety cross-check system 320 also can generate the fault message 330 when the ego motion information 414 identifies a change in tracked object movement that exceeds at least one predetermined movement threshold for the vehicle.

In some embodiments, the object annotations 424 and the ego motion information 414 can include indications of whether the tracked object movement and/or ego motion movement exceed physical or expected motion capabilities of the object or the vehicle, respectively. The safety cross-check system 320 can generate the fault messages 330 based on the indications within the object annotations 424 and the ego motion information 414.

The safety cross-check system 320 also can perform a sensor fusion safety check based on whether the primary system 400 performed sensor fusion with the measurement data 401 from each of the sensors capable of contributing measurement data 401 was utilized or fused during object detection. In some embodiments, the primary system 400 can determine if a sensor should have had measurement data to be fused in a fused detection event and provide the safety cross-check system 320 an indication of any faulty sensors. In other embodiments, the safety cross-check system 320 can receive the environmental model 415, visibility map, detection events 425, or the like, from the primary system 400 and perform the operations described above in FIG. 5 to identify any faulty sensors. When a sensor has been determined to be faulty based on a lack of fusion of the measurement data from a sensor, the safety cross-check system 320 can generate a fault message 330 to indicate that the sensor may be faulty.

The safety cross-check system 320 also can perform an object location safety check based on a location of a detected object relative to a road surface. The safety cross-check system 320 can identify types of surfaces around a detected object, such as roadway or non-roadway, utilizing a map retrieved from the memory system 430 or received from a source external to the safety cross-check system 320. The safety cross-check system 320 can compare a type of the object, such as a road-using object or a non-road-using object and compare the object type to the surface type associated with the object. For example, when the safety cross-check system 320 determines a static object type, such as a mailbox, is located on a road surface, the safety cross-check system 320 can flag the object in the environmental model 415 for a possible system error or the safety cross-check system 320 can generate a fault message 330 to indicate that the possibility of the system error.

The safety cross-check system 320 also can perform a sensor operational safety check on the sensors based on the operational characteristics of the sensors. As discussed above, the safety cross-check system 320 can receive the sensor operating characteristics 322, which can include electrical characteristics of the sensors and/or environmental factors. The safety cross-check system 320 can compare the sensor operating characteristics 322 to one or more electrical thresholds or one or more environmental thresholds to determine whether a fault may exist with one or more of the sensors. For example, the safety cross-check system 320 utilize the comparison to determine whether a sensor began consuming power outside of a historical range or a manufacturers recommended range, which could indicate the sensor includes a fault. In another example, the safety cross-check system 320 utilize the comparison to determine whether a sensor began operating at a higher temperature relative to the environment outside of a historical range or a manufacturers recommended range, which could indicate the sensor includes a fault. When a sensor has been determined to be operating outside of a historical range or a manufacturers recommended range, the safety cross-check system 320 can generate a fault message 330 to indicate that the sensor may be faulty.

Although FIGS. 3 and 4 show the safety cross-check system 320 performing the safety checks, in some embodiments, the safety checks can be performed in a distributed manner within the sensor fusion system 300, performed at least in part by the primary system 400, performed at least in part externally to the sensor fusion system 300, or the like.

Illustrative Operating Environment

The execution of various driving automation processes according to embodiments may be implemented using computer-executable software instructions executed by one or more programmable computing devices. Because these embodiments may be implemented using software instructions, the components and operation of a programmable computer system on which various embodiments of the invention may be employed will be described below.

Figure 7:
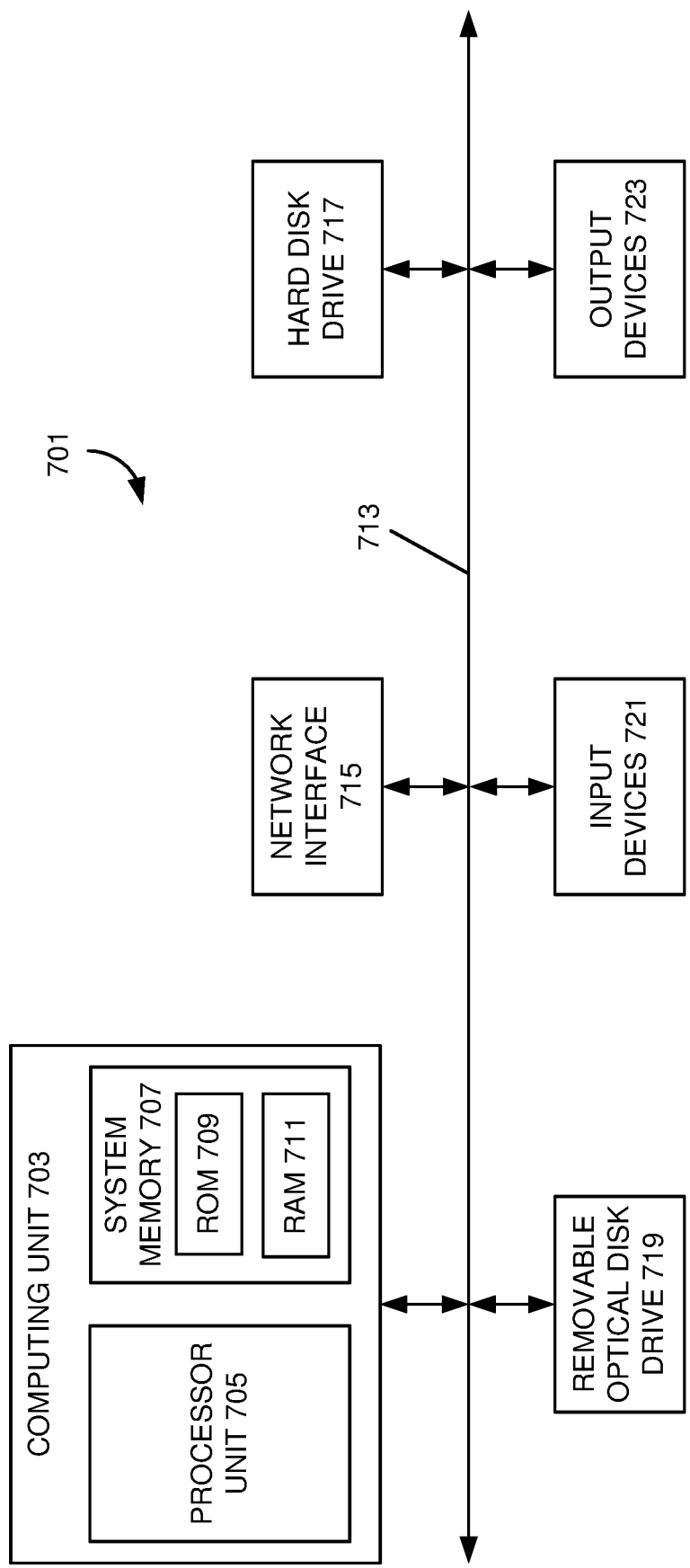
FIGS. 7 and 8 illustrate an example of a computer system of the type that may be used to implement various embodiments of the invention.
Figure 8:
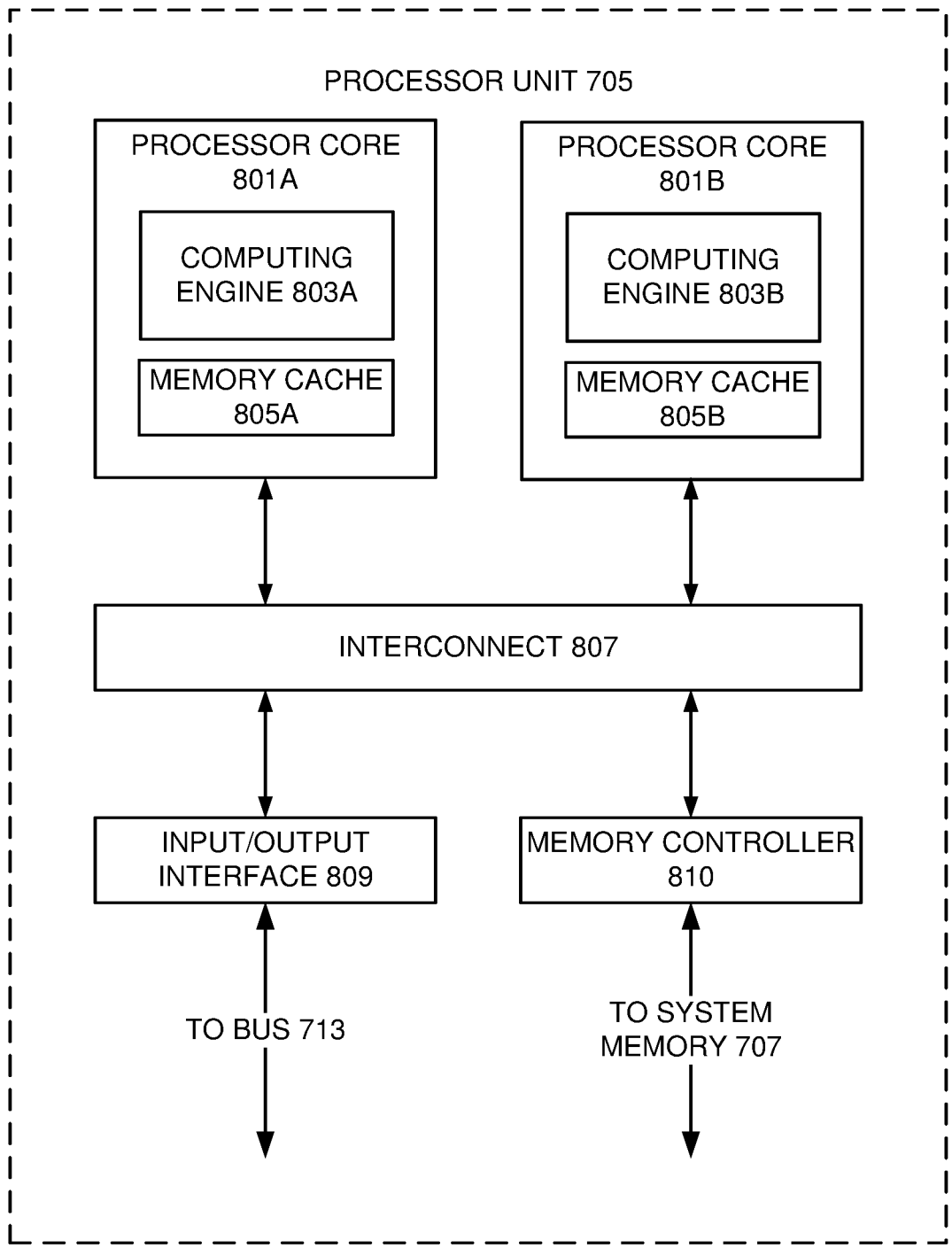

FIGS. 7 and 8 illustrate an example of a computer system of the type that may be used to implement various embodiments. Referring to FIG. 7, various examples may be implemented through the execution of software instructions by a computing device 701, such as a programmable computer. Accordingly, FIG. 7 shows an illustrative example of a computing device 701. As seen in FIG. 7, the computing device 701 includes a computing unit 703 with a processing unit 705 and a system memory 707. The processing unit 705 may be any type of programmable electronic device for executing software instructions, but will conventionally be a microprocessor. The system memory 707 may include both a read-only memory (ROM) 709 and a random access memory (RAM) 711. As will be appreciated by those of ordinary skill in the art, both the read-only memory (ROM) 709 and the random access memory (RAM) 711 may store software instructions for execution by the processing unit 705.

The processing unit 705 and the system memory 707 are connected, either directly or indirectly, through a bus 713 or alternate communication structure, to one or more peripheral devices 717-723. For example, the processing unit 705 or the system memory 707 may be directly or indirectly connected to one or more additional memory storage devices, such as a hard disk drive 717, which can be magnetic and/or removable, a removable optical disk drive 719, and/or a flash memory card. The processing unit 705 and the system memory 707 also may be directly or indirectly connected to one or more input devices 721 and one or more output devices 723. The input devices 721 may include, for example, a keyboard, a pointing device (such as a mouse, touchpad, stylus, trackball, or joystick), a scanner, a camera, and a microphone. The output devices 723 may include, for example, a monitor display, a printer and speakers. With various examples of the computing device 701, one or more of the peripheral devices 717-723 may be internally housed with the computing unit 703. Alternately, one or more of the peripheral devices 717-723 may be external to the housing for the computing unit 703 and connected to the bus 713 through, for example, a Universal Serial Bus (USB) connection.

With some implementations, the computing unit 703 may be directly or indirectly connected to a network interface 715 for communicating with other devices making up a network. The network interface 715 can translate data and control signals from the computing unit 703 into network messages according to one or more communication protocols, such as the transmission control protocol (TCP) and the Internet protocol (IP). Also, the network interface 715 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 701 is illustrated as an example only, and it not intended to be limiting. Various embodiments may be implemented using one or more computing devices that include the components of the computing device 701 illustrated in FIG. 7, which include only a subset of the components illustrated in FIG. 7, or which include an alternate combination of components, including components that are not shown in FIG. 7. For example, various embodiments may be implemented using a multi-processor computer, a plurality of single and/or multiprocessor computers arranged into a network, or some combination of both.

With some implementations, the processor unit 705 can have more than one processor core. Accordingly, FIG. 8 illustrates an example of a multi-core processor unit 705 that may be employed with various embodiments. As seen in this figure, the processor unit 705 includes a plurality of processor cores 801A and 801B. Each processor core 801A and 801B includes a computing engine 803A and 803B, respectively, and a memory cache 805A and 805B, respectively. As known to those of ordinary skill in the art, a computing engine 803A and 803B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 803A and 803B may then use its corresponding memory cache 805A and 805B, respectively, to quickly store and retrieve data and/or instructions for execution.

Each processor core 801A and 801B is connected to an interconnect 807. The particular construction of the interconnect 807 may vary depending upon the architecture of the processor unit 705. With some processor cores 801A and 801B, such as the Cell microprocessor created by Sony Corporation, Toshiba Corporation and IBM Corporation, the interconnect 807 may be implemented as an interconnect bus. With other processor units 801A and 801B, however, such as the Opteron™ and Athlon™ dual-core processors available from Advanced Micro Devices of Sunnyvale, Calif., the interconnect 807 may be implemented as a system request interface device. In any case, the processor cores 801A and 801B communicate through the interconnect 807 with an input/output interface 809 and a memory controller 810. The input/output interface 809 provides a communication interface between the processor unit 705 and the bus 713. Similarly, the memory controller 810 controls the exchange of information between the processor unit 705 and the system memory 707. With some implementations, the processor unit 705 may include additional components, such as a high-level cache memory accessible shared by the processor cores 801A and 801B. It also should be appreciated that the description of the computer network illustrated in FIG. 7 and FIG. 8 is provided as an example only, and it not intended to suggest any limitation as to the scope of use or functionality of alternate embodiments.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in a computer-readable memory device. The memory device may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory device may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory devices may be "read only" by design (ROM) by virtue of permission settings, or not. Other examples of memory devices may include, but may not be limited to, WORM, EPROM, EEPROM, FLASH, NVRAM, OTP, or the like, which may be implemented in solid state semiconductor devices. Other memory devices may comprise moving parts, such as a known rotating disk drive. All such memory devices may be "machine-readable" and may be readable by a processing device.

Operating instructions or commands may be implemented or embodied in tangible forms of stored computer software (also known as "computer program" or "code"). Programs, or code, may be stored in a digital memory device and may be read by the processing device. "Computer-readable storage medium" (or alternatively, "machine-readable storage medium") may include all of the foregoing types of computer-readable memory devices, as well as new technologies of the future, as long as the memory devices may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Conclusion

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to computing processes, it should be appreciated that various examples of the invention may be implemented using any desired combination of computing processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   generating, by a sensor fusion computing system, an environmental model populated with objects detected from measurement data collected by sensors mounted in a vehicle;
   generating, by a self-diagnosis computing system, a secondary system data structure based, at least in part, on measurement data collected by the sensors, wherein the secondary system data structure is configured to identify objects located around the vehicle that were detected from the measurement data collected by the sensors;
   identifying, by the self-diagnosis computing system, a fault in the sensors based, at least in part, on a comparison of the secondary system data structure to the environmental model;
   determining, by the self-diagnosis computing system, a velocity vector for the vehicle based on the measurement data collected by the sensors;
   identifying, by the self-diagnosis computing system, free space in the environment around the vehicle based on locations of the detected objects in the secondary system data structure relative to the vehicle; and
   estimating, by the self-diagnosis computing system, an amount of time before the vehicle crashes based, at least in part, on the velocity vector and the free space in the environment around the vehicle, wherein identifying the fault in the sensors is based, at least in part, on the estimated amount of time before the vehicle crashes.

2. The method of claim 1, wherein identifying the fault in the sensors is performed when locations of the measurement data or the detected objects in the environmental model differ from locations of the measurement data or the detected objects in the secondary system data structure.

3. The method of claim 1, wherein generating the secondary system data structure further comprises tracking movement of the detected objects, and wherein estimating the amount of time before the vehicle crashes is based, at least in part, on the velocity vector, an expected driving corridor for the vehicle, the free space in the environment around the vehicle, and the tracked movement of the detected objects.

4. The method of claim 1, wherein the velocity vector includes an estimate of a speed of the vehicle and a directionality of motion of the vehicle motion based, at least in part, on the measurement data collected by the sensors.

5. The method of claim 1, wherein identifying the fault in the sensors is performed when the estimated amount of time before the vehicle crashes falls below a preset threshold level of time.

6. The method of claim 1, wherein the secondary system data structure is configured to identify a physical border of the vehicle and locations of the detected objects, and wherein identifying the free space in the environment around the vehicle is performed by determining a distance between the detected objects in the secondary system data structure and the physical border of the vehicle in the secondary system data structure.

7. An apparatus comprising at least one memory device storing instructions configured to cause one or more processing devices to perform operations comprising:
generating a secondary system data structure configured to identify objects located around a vehicle that were detected from measurement data collected by sensors mounted in the vehicle;
comparing the objects detected in the secondary system data structure to an environmental model populated with objects detected from measurement data collected by the sensors;
identifying a fault in the sensors based, at least in part, on the comparison of the secondary system data structure to the environmental model;
determining a velocity vector for the vehicle based on the measurement data collected by the sensors;
identifying free space in the environment around the vehicle based on locations of the detected objects in the secondary system data structure relative to the vehicle; and
estimating an amount of time before the vehicle crashes based, at least in part, on the velocity vector and the free space in the environment around the vehicle, wherein identifying the fault in the sensors is based, at least in part, on the estimated amount of time before the vehicle crashes.

8. The apparatus of claim 7, wherein the instructions are further configured to cause the one or more processing devices to perform operations comprising identifying the fault in the sensors when locations of the measurement data or the detected objects in the environmental model differ from locations of the measurement data or the detected objects in the secondary system data structure.

9. The apparatus of claim 7, wherein the instructions are further configured to cause the one or more processing devices to perform operations comprising:
tracking movement of the detected objects; and
estimating the amount of time before the vehicle crashes based, at least in part, on the velocity vector, an expected driving corridor for the vehicle, the free space in the environment around the vehicle, and the tracked movement of the detected objects.

10. The apparatus of claim 7, wherein the velocity vector includes an estimate of a speed of the vehicle and a directionality of motion of the vehicle motion based, at least in part, on the measurement data collected by the sensors.

11. The apparatus of claim 7, wherein the instructions are further configured to cause the one or more processing devices to perform operations comprising identifying the fault in the sensors when the estimated amount of time before the vehicle crashes falls below a preset threshold level of time.

12. The apparatus of claim 7, wherein the secondary system data structure is configured to identify a physical border of the vehicle and locations of the detected objects, and wherein the instructions are further configured to cause the one or more processing devices to perform operations comprising identifying the free space in the environment around the vehicle by determining a distance between the detected objects in the secondary system data structure and the physical border of the vehicle in the secondary system data structure.

13. A system comprising:
a memory device configured to store machine-readable instructions; and
a computing system including one or more processing devices, in response to executing the machine-readable instructions, configured to:
generate a secondary system data structure configured to identify objects located around a vehicle that were detected from measurement data collected by sensors mounted in the vehicle;
compare the objects detected in the secondary system data structure to an environmental model populated with objects detected from measurement data collected by the sensors;
identify a fault in the sensors based, at least in part, on the comparison of the secondary system data structure to the environmental model;
determine a velocity vector for the vehicle based on the measurement data collected by the sensors;
identify free space in the environment around the vehicle based on locations of the detected objects in the secondary system data structure relative to the vehicle; and
estimate an amount of time before the vehicle crashes based, at least in part, on the velocity vector and the free space in the environment around the vehicle, wherein the fault in the sensors is identified based, at least in part, on the estimated amount of time before the vehicle crashes.

14. The system of claim 13, wherein the one or more processing devices, in response to executing the machine-readable instructions, are configured to identify the fault in the sensors when locations of the measurement data or the detected objects in the environmental model differ from locations of the measurement data or the detected objects in the secondary system data structure.

15. The system of claim 13, wherein the one or more processing devices, in response to executing the machine-readable instructions, are configured to:
track movement of the detected objects; and
estimate the amount of time before the vehicle crashes based, at least in part, on the velocity vector, an expected driving corridor for the vehicle, the free space in the environment around the vehicle, and the tracked movement of the detected objects.

16. The system of claim 13, wherein the one or more processing devices, in response to executing the machine-readable instructions, are configured to identify the fault in the sensors when the estimated amount of time before the vehicle crashes falls below a preset threshold level of time.

17. The system of claim 13, wherein the secondary system data structure is configured to identify a physical border of the vehicle and locations of the detected objects, and wherein the one or more processing devices, in response to executing the machine-readable instructions, are configured to identify the free space in the environment around the vehicle by determining a distance between the detected objects in the secondary system data structure and the physical border of the vehicle in the secondary system data structure.

* * * * *